United States Patent
Ma et al.

(10) Patent No.: US 11,388,708 B2
(45) Date of Patent: Jul. 12, 2022

(54) INDICATION METHOD AND COMMUNICATIONS APPARATUS

(71) Applicant: HUAWEI TECHNOLOGIES CO., LTD., Guangdong (CN)

(72) Inventors: Xiaojun Ma, Shenzhen (CN); Chi Zhang, Shanghai (CN); Yafei Wang, Shanghai (CN); Fang Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 87 days.

(21) Appl. No.: 16/862,231

(22) Filed: Apr. 29, 2020

(65) Prior Publication Data
US 2020/0260423 A1 Aug. 13, 2020

Related U.S. Application Data

(63) Continuation of application No. PCT/CN2018/115458, filed on Nov. 14, 2018.

(30) Foreign Application Priority Data

Nov. 17, 2017 (CN) .......................... 201711143691.0
Nov. 24, 2017 (CN) .......................... 201711195455.3

(51) Int. Cl.
*H04W 72/04* (2009.01)
*H04L 5/00* (2006.01)

(52) U.S. Cl.
CPC ........... *H04W 72/042* (2013.01); *H04L 5/001* (2013.01); *H04L 5/0094* (2013.01); *H04W 72/044* (2013.01)

(58) Field of Classification Search
CPC ..... H04L 5/0092; H04L 5/001; H04L 5/0094; H04L 5/0044; H04L 5/0007; H04W 48/12;
(Continued)

(56) References Cited

U.S. PATENT DOCUMENTS

2016/0352551 A1  12/2016 Zhang et al.
2019/0149308 A1* 5/2019 Son .................. H04L 5/0094
                                                             375/260
(Continued)

FOREIGN PATENT DOCUMENTS

CN   106301725 A    1/2017
WO   2017166276 A1  10/2017
WO   2017195483 A1  11/2017

OTHER PUBLICATIONS

LG Electronics, "R1-1710310 Discussion on the contents of group common PDCCH," Jun. 17, 2017, 3GPP TSG RAN WG1 NR Ad Hoc #2 Qingdao, China Jun. 27-30, 2017 https://www.3gpp.org/ftp/TSG_RAN/WG1_RL1/TSGR1_AH/NR_AH_1706/Docs/ (Year: 2017).*

(Continued)

*Primary Examiner* — Maharishi V Khirodhar
*Assistant Examiner* — Kenneth P Hunt
(74) *Attorney, Agent, or Firm* — Womble Bond Dickinson (US) LLP

(57) ABSTRACT

An indication method includes: receiving, by a terminal device, configuration information sent by a network device, where the configuration information includes at least two of a subcarrier configuration parameter, a time parameter of a first period, and a total quantity of slots included in the first period; and determining, by the terminal device based on the configuration information, information about a second period within which the terminal device performs data transmission by using a bandwidth part BWP. The network device may notify the terminal device of a plurality of SCSs supported by a cell and period information corresponding to the SCSs. The terminal device may determine information about a period within which data transmission is performed (Continued)

by using the BWP, so that the terminal device transmits data by using the cell.

37 Claims, 10 Drawing Sheets

(58) Field of Classification Search
CPC .. H04W 72/042; H04W 72/044; H04W 72/04
See application file for complete search history.

(56) References Cited

U.S. PATENT DOCUMENTS

| | | | |
|---|---|---|---|
| 2019/0327727 A1* | 10/2019 | Wu | H04W 72/04 |
| 2020/0084753 A1* | 3/2020 | Li | H04W 72/12 |

OTHER PUBLICATIONS

CATT, Configuration and monitoring of the group-common PDCCH. 3GPP TSG RAN WG1 Meeting #AH_NR2, Qingdao, P. R. China, Jun. 27-30, 2017, R1-1710082, 5 pages.
ZTE, Sanechips, Remaining details on group-common PDCCH. 3GPP TSG RAN WG1 Meeting #90bis, Prague, CZ, Oct. 9-13, 2017, R1-1717512, 6 pages.
Huawei, HiSilicon, UE behavior related to group-common PDCCH. 3GPP TSG RAN WG1 NR Ad Hoc Meeting, Qingdao, China, Jun. 27-30, 2017, R1-1710476, 4 pages.
LG Electronics, "Discussion on the contents of group common PDCCH",3GPP TSG RAN WG1 NR Ad Hoc #2, R1-1710310,Qingdao, China Jun. 27-30, 2017, total 6 pages.
3GPP TS 38.211 V1.0.0 (Sep. 2017),3rd Generation Partnership Project;Technical Specification Group Radio Access Network;NR;Physical channels and modulation(Release 15), total 37 pages.
3GPP TS 38.213 V1.0.0 (Sep. 2017),3rd Generation Partnership Project;Technical Specification Group Radio Access Network;NR;Physical layer procedures for control(Release 15), total 16 pages.
3GPP TS 38.331 V0.1.0 (Oct. 2017),3rd Generation Partnership Project;Technical Specification Group Radio Access Network;NR;Radio Resource Control (RRC);Protocol specification(Release 15), total 42 pages.
LG Electronics,"Discussion on slot structure indication",3GPP TSG RAN WG1 Meeting #88bis,R1-1704902,Spokane, US Apr. 3-7, 2017, total 5 pages.
Apple Inc.,"Slot Format Indicator in Group-common PDCCH",3GPP TSG-RAN WG1 NR#3,R1-1717782,Prague, Czech, Oct. 9-13, 2017, total 8 pages.
CATT,"Remaining design aspects of slot format indication",3GPP TSG RAN WG1 Meeting #90bis,R1-1717824, Prague, Czechia, Oct. 9-13, 2017, total 6 pages.

* cited by examiner

INDICATION METHOD AND COMMUNICATIONS APPARATUS

CROSS-REFERENCE TO RELATED APPLICATIONS

This application is a continuation of International Application No. PCT/CN2018/115458, filed on Nov. 14, 2018, which claims priority to Chinese Patent Application No. 201711143691.0, filed on Nov. 17, 2017 and Chinese Patent Application No. 201711195455.3, filed on Nov. 24, 2017. The disclosures of the aforementioned applications are hereby incorporated by reference in their entireties.

TECHNICAL FIELD

This application relates to the communications field, and more specifically, to an indication method and a communications apparatus in the communications field.

BACKGROUND

The 5th generation (5G) new radio (NR) technology supports a semi-static downlink/uplink (DL/UL) configuration. A base station sends signaling to a terminal device by using a cell-level message, to indicate an uplink/downlink transmission status of a slot or a symbol within a configuration period time. After receiving the message, the terminal device may perform uplink transmission in an uplink slot/on an uplink symbol according to a scheduling instruction, or perform downlink receiving in a downlink slot/on a downlink symbol. For a symbol within the configuration period, in addition to an uplink and downlink transmission resource, there is also an unknown (unknown) symbol resource. A terminal does not perform receiving and sending processing on an unknown resource.

In NR, different subcarrier width (Subcarrier Spacing, SCS) configurations, such as 15 kHz, 30 kHz, 60 kHz, . . . , and 240 kHz, are supported. Each subcarrier width corresponds to a different symbol width. In the orthogonal frequency division multiplexing (OFDM) technology, a cyclic prefix (CP) is added to counteract a multipath, and therefore a time domain width of each symbol is determined by a symbol width plus a CP width. Different SCS configurations correspond to different symbol widths. In the NR, each slot corresponds to 14 or 12 symbols, and for different SCSs, a slot corresponds to a different actual time length.

In the NR, one cell can support a plurality of SCS configurations, for a configuration period of a plurality of SCSs supported in the cell and an uplink/downlink transmission status of each slot and symbol within the period. A terminal device in the cell uses an SCS configuration. However, the terminal device in the cell cannot learn of a period corresponding to an SCS required by the terminal device to transmit data and a transmission configuration status within the period, and cannot establish a correct data connection to the base station. Communication quality of the terminal device is affected, and user experience is poor.

SUMMARY

This application provides an indication method and a communications apparatus. For information about a period of a plurality of SCSs supported in a cell and an uplink/downlink transmission status of each slot and symbol within the period, when a terminal device in the cell can support configurations of the plurality of SCSs, the terminal device may learn of information about a period corresponding to an SCS required to transmit data and a transmission configuration status within the period, to improve communication efficiency and improve user experience.

According to a first aspect, an indication method is provided, including: receiving, by a terminal device, configuration information sent by a network device, where the configuration information includes at least two of a subcarrier configuration parameter, a time parameter of a first period, and a total quantity of slots included in the first period, where the subcarrier configuration parameter corresponds to the first period; and determining, by the terminal device based on the configuration information, information about a second period within which the terminal device performs data transmission by using a bandwidth part BWP.

According to the indication method provided in the first aspect, the network device may notify the terminal device of information about a plurality of SCSs supported by a cell or a configuration period (the first period) parameter corresponding to the plurality of SCSs. After receiving the configuration information, the terminal device may determine, based on the configuration information and based on a subcarrier configuration parameter that is used by the bandwidth part BWP used for transmitting data and that is configured for the terminal device by the network device, information about a period (the information about the second period) within which data transmission is performed by using a BWP, so that the terminal device may transmit data by using the cell. In this way, data transmission efficiency is improved and user experience is improved.

In one embodiment, the configuration information includes first information and second information, the first information includes the subcarrier configuration parameter, and the second information includes at least one of the time parameter of the first period and the total quantity of slots included in the first period.

In one embodiment, configuration information of remaining minimum system information RMSI includes the first information.

In one embodiment, a synchronization signal block SSB includes the first information.

In one embodiment, the information about the second period includes a total quantity of slots included in the second period and/or a time parameter of the second period.

In one embodiment, the configuration information further includes a transmission configuration status within the first period; and the method further includes: determining, by the terminal device, a transmission configuration status within the second period based on the transmission configuration status included in the configuration information.

In one embodiment, if for the BWP, the data transmission is performed by using the subcarrier configuration parameter, the time parameter of the second period is the time parameter of the first period, and the total quantity of slots included in the second period is the total quantity of slots included in the first period.

In one embodiment, if for the BWP, the data transmission is performed by using the subcarrier configuration parameter, the time parameter of the second period is the time parameter of the first period, the total quantity of slots included in the second period is the total quantity of slots included in the first period, and the transmission configuration status within the second period is consistent with the transmission configuration status within the first period.

In one embodiment, if for the BWP, the data transmission is performed by using the subcarrier configuration parameter as a configuration parameter of a reference subcarrier, the time parameter of the second period is the time parameter of the first period, and the total quantity of slots included in the second period has a multiple relationship with the total quantity of slots included in the first period.

In one embodiment, if for the BWP, the data transmission is performed by using the subcarrier configuration parameter as a configuration parameter of a reference subcarrier, the time parameter of the second period is the time parameter of the first period, the total quantity of slots included in the second period has a multiple relationship with the total quantity of slots included in the first period, and within any same time segment, the transmission configuration status within the second period is consistent with the transmission configuration status within the first period.

In one embodiment, a time length of the first period is $5*2^{-n}$ milliseconds, and n is an integer greater than 0.

In one embodiment, the total quantity of slots included in the first period includes five.

According to a second aspect, an indication method is provided, including: generating, by a network device, configuration information, where the configuration information includes at least two of a subcarrier configuration parameter, a time parameter of a first period, and a total quantity of slots included in the first period, where the subcarrier configuration parameter corresponds to the first period; and sending, by the network device, the configuration information to a terminal device, where the configuration information is used for determining information about a second period within which the terminal device performs data transmission by using a bandwidth part BWP.

According to the indication method provided in the second aspect, the network device may notify the terminal device of information about a plurality of SCSs supported by a cell or a configuration period (the first period) parameter corresponding to the plurality of SCSs. After receiving the configuration information, the terminal device may determine, based on the configuration information and based on a subcarrier configuration parameter that is used by the bandwidth part BWP used for transmitting data and that is configured for the terminal device by the network device, information about a period (the information about the second period) within which data transmission is performed by using a BWP, so that the terminal device may transmit data by using the cell. In this way, data transmission efficiency is improved and user experience is improved.

In one embodiment, the configuration information includes first information and second information, the first information includes the subcarrier configuration parameter, and the second information includes at least one of the time parameter of the first period and the total quantity of slots included in the first period.

In one embodiment, configuration information that is of remaining minimum system information RMSI and that is sent by the network device includes the first information.

In one embodiment, a synchronization signal block SSB sent by the network device includes the first information.

In one embodiment, the information about the second period includes a total quantity of slots included in the second period and/or a time parameter of the second period.

In one embodiment, the configuration information further includes a transmission configuration status within the first period.

In one embodiment, if for the BWP, the data transmission is performed by using the subcarrier configuration parameter, the time parameter of the second period is the time parameter of the first period, and the total quantity of slots included in the second period is the total quantity of slots included in the first period.

In one embodiment, if for the BWP, the data transmission is performed by using the subcarrier configuration parameter, the time parameter of the second period is the time parameter of the first period, the total quantity of slots included in the second period is the total quantity of slots included in the first period, and the transmission configuration status within the second period is consistent with the transmission configuration status within the first period.

In one embodiment, if for the BWP, the data transmission is performed by using the subcarrier configuration parameter as a configuration parameter of a reference subcarrier, the time parameter of the second period is the time parameter of the first period, and the total quantity of slots included in the second period has a multiple relationship with the total quantity of slots included in the first period.

In one embodiment, if for the BWP, the data transmission is performed by using the subcarrier configuration parameter as a configuration parameter of a reference subcarrier, the time parameter of the second period is the time parameter of the first period, the total quantity of slots included in the second period has a multiple relationship with the total quantity of slots included in the first period, and within any same time segment, the transmission configuration status within the second period is consistent with the transmission configuration status within the first period.

In one embodiment, a time length of the first period is $5*2^{-n}$ milliseconds, and n is an integer greater than 0.

In one embodiment, the total quantity of slots included in the first period includes five.

According to a third aspect, an indication method is provided, including: receiving, by a terminal device, first information sent by a network device, where the first information includes a subcarrier configuration parameter corresponding to a first period; receiving, by the terminal device, second information sent by the network device, where the second information includes at least one of a time parameter of the first period and a total quantity of slots included in the first period; and determining, by the terminal device based on the first information and the second information, information about a second period within which the terminal device performs data transmission by using a bandwidth part BWP.

According to the indication method provided in the third aspect, the network device may use different signaling (the first information and the second information) to notify the terminal device of information about a plurality of SCSs supported by a cell and a configuration period (the first period) parameter corresponding to the plurality of SCSs. After receiving the signaling, the terminal device may determine, based on a subcarrier configuration parameter that is used by the bandwidth part BWP used for transmitting data and that is configured for the terminal device by the network device, information about a period (the information about the second period) within which data transmission is performed by using a BWP, so that the terminal device may transmit data by using the cell. In this way, data transmission efficiency is improved. In addition, the terminal device may flexibly obtain, in a plurality of manners, configuration information of the subcarrier and information about the first period corresponding to the subcarrier configuration parameter. In this way, flexibility of obtaining the subcarrier configuration parameter by the terminal device is improved, and user experience is improved.

In one embodiment, configuration information of remaining minimum system information RMSI includes the first information, and the configuration information of the RMSI includes a subcarrier configuration parameter used by the RMSI; and the determining, by the terminal device based on the first information and the second information, information about a second period within which the terminal device performs data transmission by using a bandwidth part BWP includes: determining, by the terminal device, as the subcarrier configuration parameter corresponding to the first period, the subcarrier configuration parameter used by the RMSI; and determining, by the terminal device based on the second information and the subcarrier configuration parameter used by the RMSI, the information about the second period within which the terminal device performs data transmission by using the bandwidth part BWP.

In one embodiment, a synchronization signal block SSB includes the first information; and the determining, by the terminal device based on the first information and the second information, information about a second period within which the terminal device performs data transmission by using a bandwidth part BWP includes: determining, by the terminal device, as the subcarrier configuration parameter corresponding to the first period, a subcarrier configuration parameter used by the synchronization signal block SSB sent by the network device; and determining, by the terminal device based on the second information and the subcarrier configuration parameter used by the SSB, the information about the second period within which the terminal device performs data transmission by using the bandwidth part BWP.

In one embodiment, the information about the second period includes a total quantity of slots included in the second period and/or a time parameter of the second period.

In one embodiment, the second information further includes a transmission configuration status within the first period. The method further includes: determining, by the terminal device, a transmission configuration status within the second period based on the transmission configuration status included in the second information.

In one embodiment, if for the BWP, the data transmission is performed by using the subcarrier configuration parameter, the time parameter of the second period is the time parameter of the first period, and the total quantity of slots included in the second period is the total quantity of slots included in the first period.

In one embodiment, if for the BWP, the data transmission is performed by using the subcarrier configuration parameter, the time parameter of the second period is the time parameter of the first period, the total quantity of slots included in the second period is the total quantity of slots included in the first period, and the transmission configuration status within the second period is consistent with the transmission configuration status within the first period.

In one embodiment, if for the BWP, the data transmission is performed by using the subcarrier configuration parameter as a configuration parameter of a reference subcarrier, the time parameter of the second period is the time parameter of the first period, and the total quantity of slots included in the second period has a multiple relationship with the total quantity of slots included in the first period.

In one embodiment, if for the BWP, the data transmission is performed by using the subcarrier configuration parameter as a configuration parameter of a reference subcarrier, the time parameter of the second period is the time parameter of the first period, the total quantity of slots included in the second period has a multiple relationship with the total quantity of slots included in the first period, and within any same time segment, the transmission configuration status within the second period is consistent with the transmission configuration status within the first period.

In one embodiment, a time length of the first period is $5*2^{-n}$ milliseconds, and n is an integer greater than 0.

In one embodiment, the total quantity of slots included in the first period includes five.

According to a fourth aspect, an indication method is provided, including: sending, by a network device, first information to a terminal device, where the first information includes a subcarrier configuration parameter corresponding to a first period; and sending, by the network device, second information to the terminal device, where the second information includes at least one of a time parameter of the first period and a total quantity of slots included in the first period; and the first message and the second message are used by the terminal device to determine information about a second period within which the terminal device performs data transmission by using a bandwidth part BWP.

According to the indication method provided in the fourth aspect, the network device may use different signaling (the first information and the second information) to notify the terminal device of information about a plurality of SCSs supported by a cell and a configuration period (the first period) parameter corresponding to the plurality of SCSs. After receiving the different signaling, the terminal device may determine, based on a subcarrier configuration parameter that is used by the bandwidth part BWP used for transmitting data and that is configured for the terminal device by the network device, information about a period (the information about the second period) within which data transmission is performed by using a BWP, so that the terminal device may transmit data by using the cell. In this way, data transmission efficiency is improved. In addition, the terminal device may flexibly obtain, in a plurality of manners, configuration information of the subcarrier and information about the first period corresponding to the subcarrier configuration parameter. In this way, flexibility of obtaining the subcarrier configuration parameter by the terminal device is improved, and user experience is improved.

In one embodiment, configuration information that is of remaining minimum system information RMSI and that is sent by the network device includes the first information, and the configuration information of the RMSI includes a subcarrier configuration parameter used by the RMSI.

In one embodiment, a synchronization signal block SSB sent by the network device includes the first information.

In one embodiment, the information about the second period includes a total quantity of slots included in the second period and/or a time parameter of the second period.

In one embodiment, the second information further includes a transmission configuration status within the first period.

In one embodiment, if for the BWP, the data transmission is performed by using the subcarrier configuration parameter, the time parameter of the second period is the time parameter of the first period, and the total quantity of slots included in the second period is the total quantity of slots included in the first period.

In one embodiment, if for the BWP, the data transmission is performed by using the subcarrier configuration parameter, the time parameter of the second period is the time parameter of the first period, the total quantity of slots included in the second period is the total quantity of slots included in the first period, and the transmission configuration status within the second period is consistent with the transmission configuration status within the first period.

In one embodiment, if for the BWP, the data transmission is performed by using the subcarrier configuration parameter as a configuration parameter of a reference subcarrier, the time parameter of the second period is the time parameter of the first period, and the total quantity of slots included in the second period has a multiple relationship with the total quantity of slots included in the first period.

In one embodiment, if for the BWP, the data transmission is performed by using the subcarrier configuration parameter as a configuration parameter of a reference subcarrier, the time parameter of the second period is the time parameter of the first period, the total quantity of slots included in the second period has a multiple relationship with the total quantity of slots included in the first period, and within any same time segment, the transmission configuration status within the second period is consistent with the transmission configuration status within the first period.

In one embodiment, a time length of the first period is $5*2^{-n}$ milliseconds, and n is an integer greater than 0.

In one embodiment, the total quantity of slots included in the first period includes five.

According to a fifth aspect, an indication method is provided, including: receiving, by a terminal device, configuration information sent by a network device, where the configuration information includes at least one of a time parameter of a first period and a total quantity of slots included in the first period; determining, by the terminal device, as a subcarrier configuration parameter corresponding to the first period, a subcarrier configuration parameter used for transmitting the configuration information; and determining, by the terminal device based on the configuration information and the subcarrier configuration parameter corresponding to the first period, information about a second period within which the terminal device performs data transmission by using a bandwidth part BWP.

According to the indication method provided in the fifth aspect, the network device may notify the terminal device of a configuration period (the first period) parameter that corresponds to a plurality of SCSs and that is supported by a cell. After receiving the configuration information, the terminal device may determine, as the subcarrier configuration parameter corresponding to the first period, a subcarrier configuration parameter pre-defined in a system, and determine, based on a subcarrier configuration parameter that is used by the bandwidth part BWP used for transmitting data and that is configured for the terminal device by the network device, information about a period (the information about the second period) within which data transmission is performed by using the BWP, so that the terminal device may transmit data by using the cell. In this way, data transmission efficiency is improved, signaling interactions between the network device and the terminal device is reduced, and a resource is saved.

According to a sixth aspect, a communications apparatus is provided, including a processor, a memory, and a transceiver, to support the communications apparatus in performing a corresponding function of the terminal device in the foregoing method. The processor, the memory, and the transceiver are in communication connection with each other. The memory stores an instruction. The transceiver is configured to be driven by the processor to perform specific signal receiving and sending. The processor is configured to invoke the instruction to implement the indication method in the foregoing first aspect, third aspect, and fifth aspect and various embodiments in the first aspect, the third aspect, and the fifth aspect.

According to a seventh aspect, a communications apparatus is provided, including a processing module, a storage module, and a transceiver module, to support the communications apparatus in performing a function of the terminal device in the foregoing first aspect, third aspect, and fifth aspect and any embodiment in the first aspect, the third aspect, and the fifth aspect. The function may be implemented by using hardware, or may be implemented by hardware executing corresponding software. The hardware or the software includes one or more modules corresponding to the function.

According to an eighth aspect, a communications apparatus is provided, including a processor, a memory, and a transceiver, to support the communications apparatus in performing a corresponding function of the network device in the foregoing method. The processor, the memory, and the transceiver are in communication connection with each other. The memory stores an instruction. The transceiver is configured to be driven by the processor to perform specific signal receiving and sending. The processor is configured to invoke the instruction to implement the indication method in the foregoing second aspect and fourth aspect and various embodiments in the second aspect and the fourth aspect.

According to a ninth aspect, a communications apparatus is provided, including a processing module, a storage module, and a transceiver module, to support the communications apparatus in performing a function of the network device in the foregoing second aspect and fourth aspect and any embodiment in the second aspect and the fourth aspect. The function may be implemented by using hardware, or may be implemented by hardware executing corresponding software. The hardware or the software includes one or more modules corresponding to the function.

According to a tenth aspect, a computer readable storage medium is provided, configured to store a computer program. The computer program includes an instruction used for performing the method in the first aspect to the fifth aspect or any embodiment of the first aspect to the fifth aspect.

According to an eleventh aspect, a system chip is provided, including: a processing unit and a communications unit. The processing unit and the processing unit may execute a computer instruction, so that a chip in the terminal performs the method in the first aspect to the fifth aspect or any embodiment of the first aspect to the fifth aspect.

DESCRIPTION OF EMBODIMENTS

The following describes technical solutions of this application with reference to accompanying drawings.

The technical solutions in embodiments of this application may be applied to various communications systems, for example, a 5th generation (5G) system or New Radio (NR) in the future.

The terminal device in the embodiments of this application may also be referred to as user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN). This is not limited in the embodiments of this application.

A network device in embodiments of this application may be a device configured to communicate with a terminal device. The network device may be a base station, and includes but is not limited to a wireless controller in a cloud radio access network (CRAN) scenario. Alternatively, the network device may be a relay station, an access point, an in-vehicle device, a wearable device, a network device in a future 5G network, or a network device in a future evolved PLMN network. This is not limited in the embodiments of this application.

Figure 1:
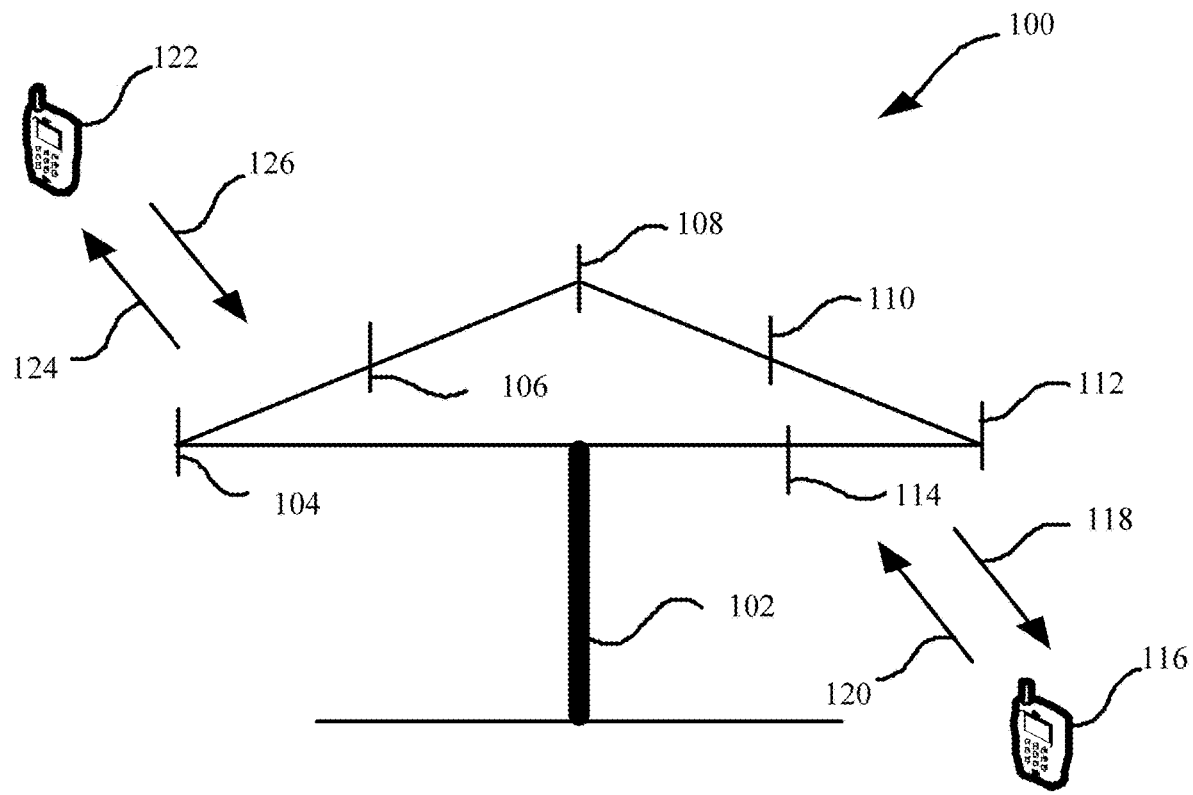
FIG. 1 is a schematic diagram of a communications system applicable to an indication method of this application.

FIG. 1 is a schematic diagram of a communications system applicable to an indication method of this application. As shown in FIG. 1, the communications system 100 includes a network device 102. The network device 102 may include a plurality of antennas, such as antennas 104, 106, 108, 110, 112, and 114. In addition, the network device 102 may additionally include a transmitter chain and a receiver chain, and a person of ordinary skill in the art may understand that both the transmitter chain and the receiver chain may include a plurality of components (such as a processor, a modulator, a multiplexer, an encoder, a demultiplexer, and an antenna) related to signal sending and receiving.

The network device 102 may communicate with a plurality of terminal devices (such as a terminal device 116 and a terminal device 122). To be specific, the network device may send signaling to the terminal device, to notify the terminal device of a transmission status on each slot and/or symbol. The terminal device receives the signaling, and performs corresponding data transmission based on content of the signaling. In other words, the terminal device may access a BWP of a cell, to perform related data receiving or information sending based on a configured transmission parameter, and need to determine the transmission status on each slot and/or symbol.

It may be understood that, the network device 102 may communicate with any quantity of terminal devices similar to the terminal device 116 or 122. The terminal devices 116 and 122 may each be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD) system, the forward link 118 may use a frequency band different from a frequency band used by the reverse link 120, and the forward link 124 may use a frequency band different from a frequency band used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or each area designed for communication is referred to as a sector of the network device 102. For example, an antenna group may be designed to communicate with a terminal device in a sector within coverage of the network device 102. When the network device 102 communicates with the terminal devices 116 and 122 respectively over the forward links 118 and 124, transmit antennas of the network device 102 may improve signal-to-noise ratios of the forward links 118 and 124 through beamforming. In addition, compared with a manner in which the network device sends, by using a single antenna, a signal to all terminal devices served by the network device, when the network device 102 sends, through beamforming, a signal to the terminal devices 116 and 122 that are randomly distributed within related coverage, less interference is caused to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits that need to be sent to the wireless communications receiving apparatus through a channel. The data bits may be included in a transport block (or a plurality of transport blocks) of the data, and the transport block may be segmented to produce a plurality of code blocks.

In addition, the communications system 100 may be a PLMN network, a device-to-device (D2D) network, a machine to machine (M2M) network, or another network. FIG. 1 is only an example of a simplified schematic diagram. The network may further include another network device that is not drawn in FIG. 1.

Figure 2:
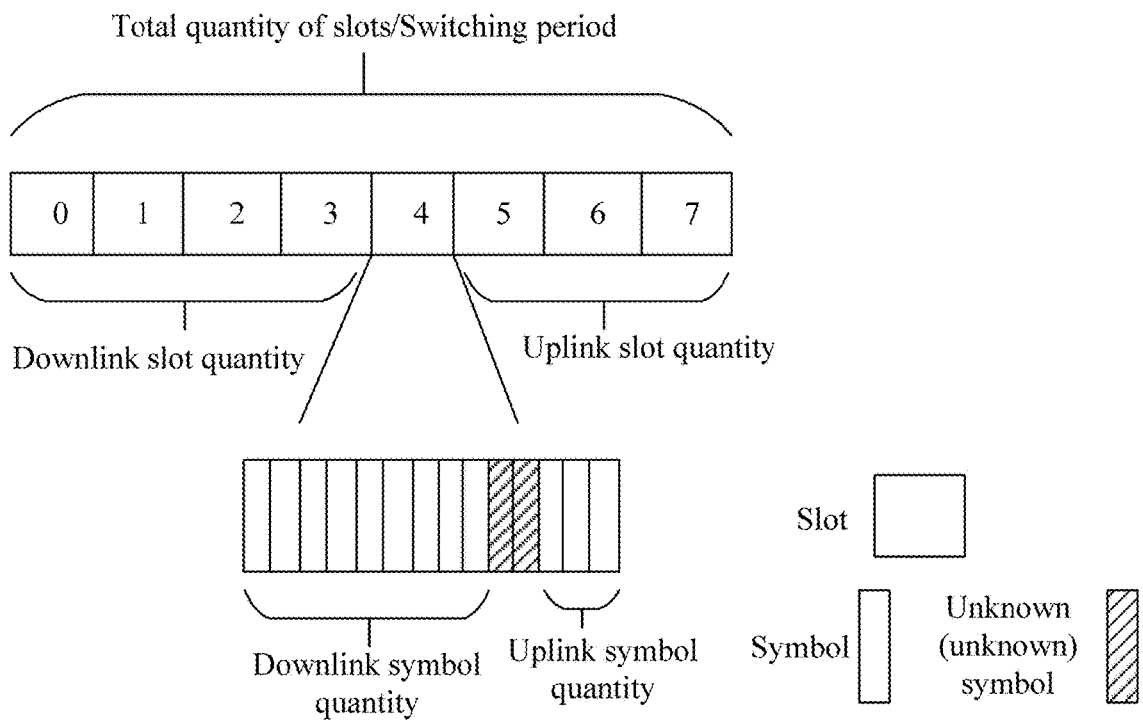
FIG. 2 is a schematic diagram of a period configuration according to an embodiment of this application.

An NR technology supports a semi-static downlink/uplink configuration. The network device sends signaling to the terminal device by using a cell-level message, such as broadcast information, to indicate an uplink/downlink transmission status of a slot or a symbol within a configuration period time. After receiving the signaling, the terminal device may perform uplink transmission in an uplink slot/on an uplink symbol according to a scheduling instruction, or perform downlink receiving in a downlink slot/on a downlink symbol. For a symbol within the configuration period, in addition to uplink and downlink transmission resources, there is also an unknown symbol resource. A terminal does not perform receiving and sending processing on an unknown resource. FIG. 2 is a schematic diagram of a period configuration according to an embodiment of this application. A configured period shown in FIG. 2 includes eight slots (in other words, a switching period is eight slots). The first four slots (slots 0 to 3) are used for downlink transmission, and the last three slots (slots 5 to 7) are used for uplink transmission. In the fifth slot (a slot 4), the first 10 symbols are used for downlink transmission, the last two symbols are used for uplink transmission, and the remaining two symbols are unknown symbols. The network device notifies the terminal device of period configuration information shown in FIG. 1. After receiving the configuration information, the terminal device may perform uplink and downlink transmission based on an uplink/downlink transmission status of each symbol or slot within the configuration period and based on scheduling signaling of the network device.

Figure 3:
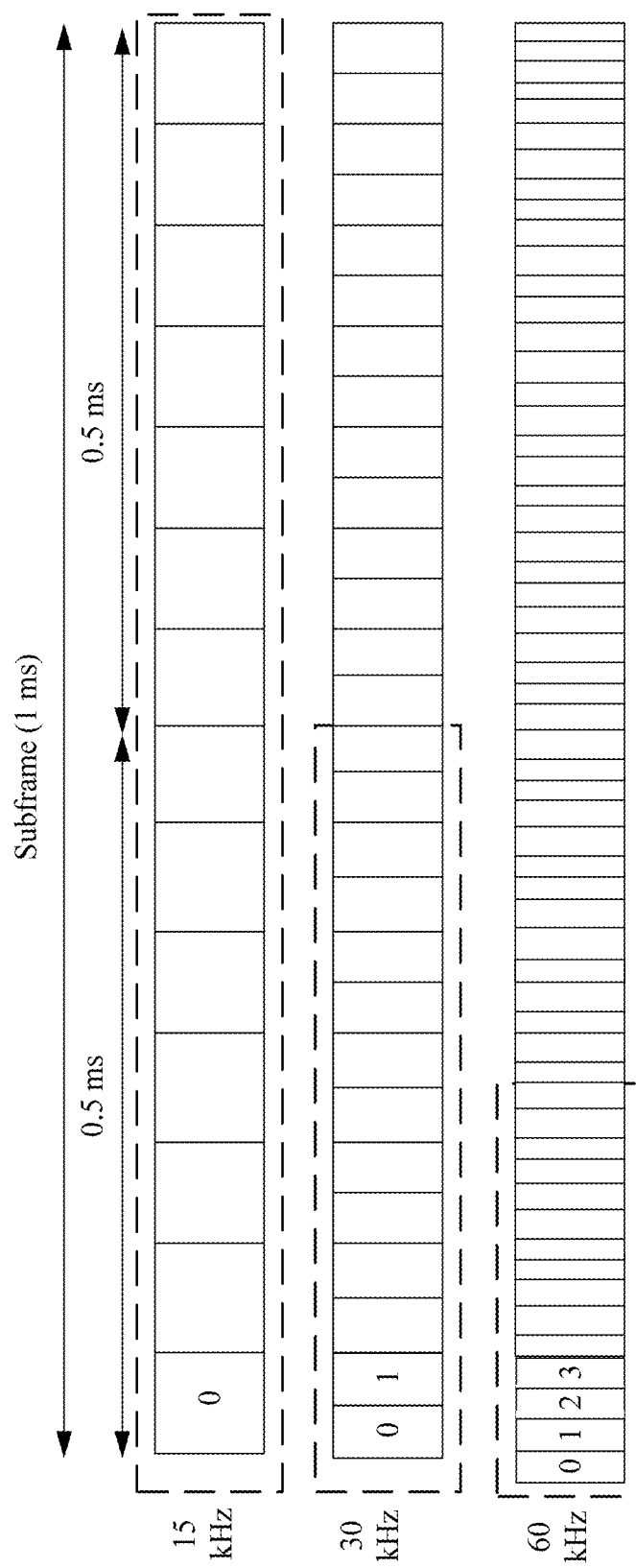
FIG. 3 is a schematic structural diagram of a next slot for different subcarrier widths according to an embodiment of this application.

In NR, different SCS configurations such as 15 kHz, 30 kHz, 60 kHz, . . . , and 240 kHz are supported. Each subcarrier width corresponds to a different symbol width. In the NR, one slot includes 14 symbols (corresponding to a regular CP) or 12 symbols (corresponding to an extended CP). For different SCSs, one slot corresponds to different actual time lengths. In the NR, time domain symbols of subcarriers are required to be aligned at a 0.5 ms granularity. FIG. 3 is a schematic structural diagram of a next slot for different subcarrier widths according to an embodiment of this application. As shown in FIG. 3, for a 15 kHz subcarrier, 0.5 ms duration includes seven symbols. For a 30 kHz subcarrier, 0.5 ms duration includes 14 symbols. For a 60 kHz subcarrier, 0.5 ms duration includes 28 symbols. Each subcarrier spacing is selected based on a multiple or a decimal of 15 kHz. With the restriction of the foregoing alignment, symbol numbers of the different SCSs have a correspondence. For example, a location of the 15 kHz first symbol (a symbol 0) corresponds to the 30 kHz first and second symbols (symbols 0 and 1), or the 60 kHz first to fourth symbols (symbols 0, 1, 2, and 3). A box in a dashed line in FIG. 3 represents one slot including 14 symbols on each SCS.

In a long term evolution (LTE) system, for a TDD mode, an uplink and downlink notification manner of a semi-static period is used. Specifically, an uplink and downlink configuration parameter and a configuration parameter that is of a special slot are used in a broadcast message to determine an uplink/downlink transmission status of each symbol within a period. A configuration period of LTE is fixed 10 ms (a length of one radio frame), a configured uplink-downlink configuration is selected from several fixed configurations such as 0 to 6 in Table 1. S in Table 1 represents a special slot. D represents a downlink transmission direction, and U represents an uplink transmission direction.

TABLE 1

Table of uplink and downlink configurations in LTE

| Uplink/ Downlink config- uration | Uplink and downlink switching period (ms) | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 | D | S | U | U | U | D | S | U | U | U |
| 1 | 5 | D | S | U | U | D | D | S | U | U | D |
| 2 | 5 | D | S | U | D | D | D | S | U | D | D |
| 3 | 10 | D | S | U | U | U | D | D | D | D | D |
| 4 | 10 | D | S | U | U | D | D | D | D | D | D |
| 5 | 10 | D | S | U | D | D | D | D | D | D | D |
| 6 | 5 | D | S | U | U | U | D | S | U | U | D |

A configuration of a special slot is also selected from several predetermined configurations. Table 2 is a table of configurations of special slots.

TABLE 2

Table of configurations of special slots

| | Downlink (Regular CP) | | | Downlink (Extended CP) | | |
|---|---|---|---|---|---|---|
| Special | | Uplink pilot slot | | | Uplink pilot slot | |
| subframe configuration | Downlink pilot slot | Uplink (Regular CP) | Uplink (Extended CP) | Downlink pilot slot | Uplink (Regular CP) | Uplink (Regular CP) |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |

TABLE 2-continued

Table of configurations of special slots

| | | Downlink (Regular CP) | | | Downlink (Extended CP) | |
| --- | --- | --- | --- | --- | --- | --- |
| Special | | Uplink pilot slot | | | Uplink pilot slot | |
| subframe configuration | Downlink pilot slot | Uplink (Regular CP) | Uplink (Extended CP) | Downlink pilot slot | Uplink (Regular CP) | Uplink (Regular CP) |
| 8 | 24144 · $T_s$ | | | | | |
| 9 | 13168 · $T_s$ | | | | | |

In the LTE system, one cell corresponds to only one SCS. Therefore, in the LTE system, the network device broadcasts configuration period information of only one SCS. That is, according to a method for indicating a semi-static configuration period in LTE, a fixed uplink-downlink switching period can be indicated for only one SCS.

In the NR, one cell can support a plurality of SCSs. For a configuration period of the plurality of SCSs supported in the cell and an uplink/downlink transmission status of each slot and symbol within the period, a terminal device in the cell can support configurations of the plurality of SCSs, and the terminal device cannot learn that the terminal device needs to transmit data and use a period corresponding to a BWP of an SCS parameter, and cannot learn of a transmission configuration status of each symbol within the period, affecting communication quality of the terminal device.

Based on the foregoing problem, this application provides an indication method. For that the plurality of SCSs are supported in the one cell, the network device may send, to the terminal device, the configuration period (namely, a first period) that corresponds to the plurality of SCSs and that is supported in the cell and the uplink/downlink transmission status of each slot and symbol in the period. The terminal device in the cell may learn that the terminal device needs a period (a second period) corresponding to an SCS and a transmission configuration status within the period, and may perform data transmission in a BWP that uses an SCS parameter. In this way, communication efficiency is improved and user experience is improved.

Figure 4:
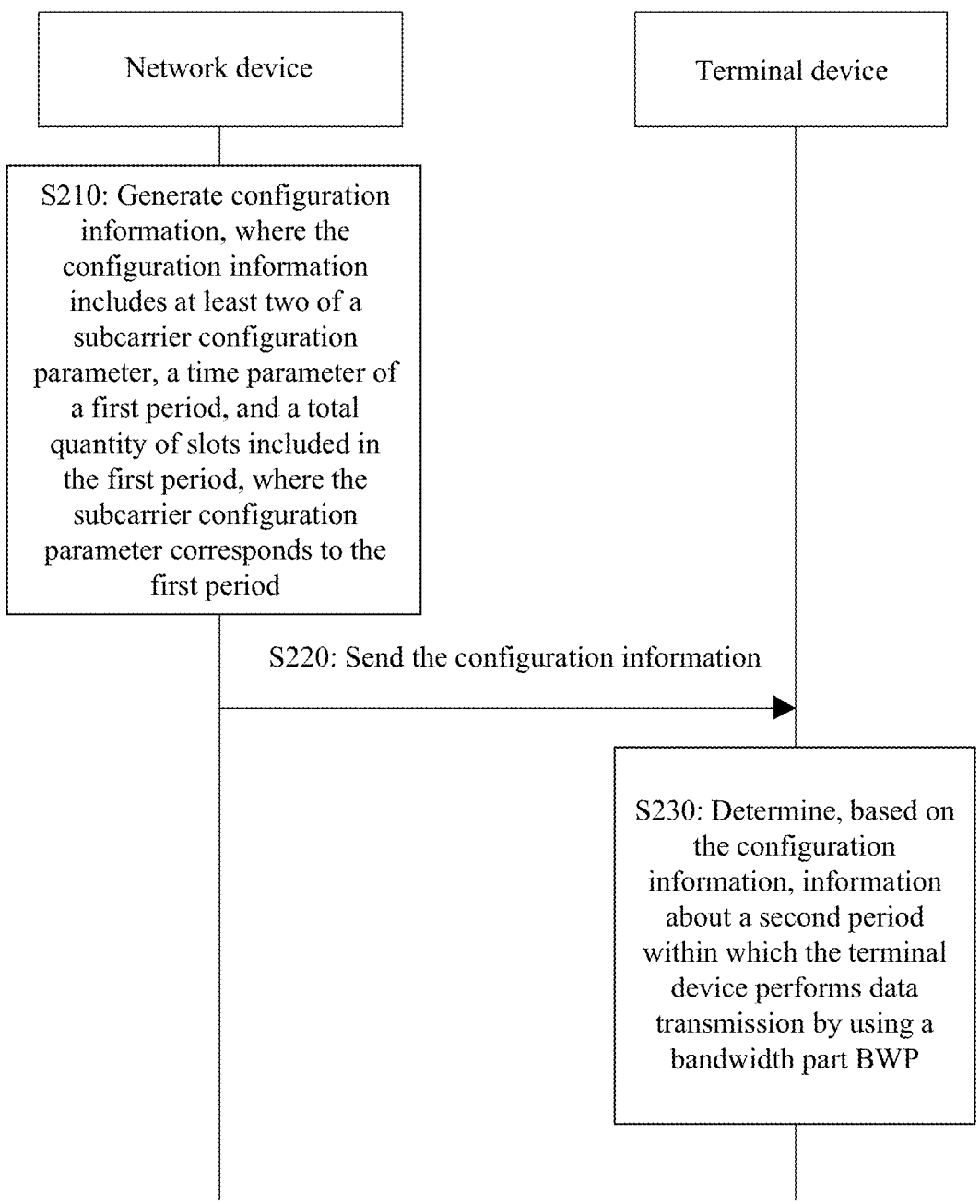
FIG. 4 is a schematic flowchart of an indication method according to an embodiment of this application.

With reference to FIG. 4, the following describes in detail the indication method provided in this application. FIG. 4 is a schematic flowchart of an indication method 200 according to an embodiment of this application. The method 200 may be applied to the scenario shown in FIG. 1, and certainly may also be applied to another communication scenario. This is not limited in this embodiment of this application herein.

S210: A network device generates configuration information, where the configuration information includes at least two of a subcarrier configuration parameter, a time parameter of a first period, and a total quantity of slots (total-number-of-slots) included in the first period, where the subcarrier corresponds to the first period.

S220: The network device sends the configuration information to a terminal device. Correspondingly, the terminal device receives the configuration information.

S230: The terminal device determines, based on the configuration information, information about a second period within which the terminal device performs data transmission by using a bandwidth part BWP.

According to the indication method provided in this embodiment of this application, the network device may notify the terminal device of information about a plurality of SCSs supported by a cell or a configuration period (the first period) parameter corresponding to the plurality of SCSs. After receiving the configuration information, the terminal device may determine, based on the configuration information and based on a subcarrier configuration parameter that is used by the bandwidth part (BWP) used for transmitting data and that is configured for the terminal device by the network device, information about a period (the information about the second period) within which data transmission is performed by using a BWP, so that the terminal device may transmit data by using the cell. In this way, data transmission (for example, transmission of control, data, and access signals) efficiency is improved and user experience is improved.

Specifically, in S210, the network device generates the configuration information, where the configuration information includes the at least two of the subcarrier configuration parameter, the time parameter of the first period, and the total quantity of slots included in the first period, where the subcarrier corresponds to the first period. For example, it is assumed that a cell supports 15 kHz, 30 kHz, and 60 kHz subcarriers. The configuration parameter (specific-numerology) of the subcarrier may be Numerologies numbers of different subcarriers, or may be another value related to a feature of the subcarrier. The time parameter of the first period may be an absolute time length of the first period, a multiple of a time unit, or the like.

In S220, the network device may send the configuration information to the terminal device by using broadcast information or another RRC message. Correspondingly, the terminal device receives the configuration information.

In S230, the terminal device determines, based on the configuration information, information about the second period within which the terminal device performs data transmission by using the bandwidth part BWP. One cell may support configurations of a plurality of SCSs. A base station implements a frequency domain configuration of the terminal device by using the BWP, classified into an uplink BWP and a downlink BWP. Each BWP may use one SCS parameter. Each SCS corresponds to one group of period parameters. The terminal device may determine, based on the configuration information, information about a second period for a BWP that is used for transmitting data and that is configured for the terminal device by the network device. For example, the configuration information includes information about an SCS corresponding to the BWP or information about a period corresponding to the SCS. Alternatively, the configuration information does not include information about an SCS corresponding to the BWP or information about a period corresponding to the SCS, but a mapping relationship exists between the information about the period corresponding to the SCS and the information about the period of the SCS corresponding to the BWP that are included in the configuration information. In this case, the terminal device may determine the second period for the BWP used for transmitting data, and the terminal device may perform corresponding data transmission by using the BWP after determining the information about the second period.

For example, it is assumed that the BWP configured for the terminal device by the network device uses a configuration parameter whose subcarrier width is 30 kHz. It is assumed that the configuration information includes a configuration parameter whose subcarrier configuration parameter is 30 kHz and a time parameter of a first period corresponding to the 30 kHz configuration parameter. In other words, content of the configuration information may be: the subcarrier configuration parameter is a 30 kHz subcarrier, and the time parameter of the first period is: a period corresponding to the 30 kHz subcarrier is 2.5 ms. Because for the 30 kHz subcarrier, a time length of each slot (including 14 symbols) is 0.5 ms, the terminal device may determine that, for the 30 kHz subcarrier, a 2.5 ms period includes five slots. Therefore, it may be deduced that the total quantity of slots included in the first period is five when the first period is 2.5 ms. In other words, another piece of information, namely, the total quantity of slots included in the first period, in the configuration information may be deduced. Therefore, the terminal device may determine the information about the second period within which the data transmission is performed by using the BWP. For example, it may be determined that the time length of the second period is 2.5 ms, and a total quantity of corresponding slots is five.

For another example, it is assumed that the BWP configured for the terminal device by the network device uses a subcarrier width that is 60 kHz. It is assumed that the configuration information includes a configuration parameter whose subcarrier configuration parameter is 60 kHz and a total quantity of slots included in a first period corresponding to the 60 kHz configuration parameter. In this case, content of the configuration information may be: a subcarrier configuration parameter is a 60 kHz subcarrier, and the total quantity of the slots included in the first period is 10. Because for the 60 kHz subcarrier, a time length of each slot (including 14 symbols) is 0.25 ms, it may be determined that the time length of the first period is 2.5 ms when the total quantity of slots included in the first period is 10. In other words, another piece of information, namely, the time parameter of the first period, in the configuration information may be deduced. Therefore, the terminal device may determine the information about the second period within which the data transmission is performed by using the BWP. For example, it may be determined that a total quantity of slots included in a second period is 10, and a corresponding time length is 2.5 ms.

For another example, it is assumed that the BWP configured for the terminal device by the network device uses a subcarrier width that is 30 kHz. It is assumed that the configuration information includes the time parameter of the first period and the total quantity of slots included in the first period. For example, the time parameter of the first period may be: the time length of the first period is 5 ms, and the total quantity of slots included in the first period may be: the total quantity of slots included in the first period whose time length is 5 ms is 10. The terminal device may determine, based on the foregoing two types of information, that a length of each slot is 0.5 ms, and the corresponding subcarrier is 30 kHz when the length of each slot is 0.5 ms. Therefore, the terminal device may determine that the BWP is a BWP in a subcarrier width of 30 kHz, and duration of the second period is 5 ms.

A subcarrier configuration parameter corresponds to a period. In other words, a period corresponding to a subcarrier may be determined based on a subcarrier configuration parameter. To be specific, that a subcarrier configuration parameter corresponds to a first period may be understood as that the first period corresponding to the subcarrier may be determined based on the subcarrier configuration parameter. The first period is a set including a plurality of different parameters. For example, the parameters may include a total quantity of slots included in the first period, a time length of the first period, and the like, and the time length of the first period and the total quantity of slots included in the first period may each have a plurality of values. For example, a subcarrier configuration parameter includes a 30 kHz SCS. A first period corresponding to the subcarrier may include: duration of the first period may be 5 ms, and a total quantity of slots in the first period is 10; or duration of the first period may be 10 ms, and a total quantity of slots included in the first period is 20. For another example, a subcarrier configuration parameter includes a 15 kHz SCS. In this case, a first period corresponding to the subcarrier may include: duration of the first period may be 5 ms, and a total quantity of slots included in the first period is five; or duration of the first period may be 10 ms, and a total quantity of slots included in the first period is 10.

It should be further understood that, the first period and the second period are only for distinguishing between periods in two different types of information, and should not be construed as any limitation on the scope of this application.

In one embodiment, the configuration information includes first information and second information, the first information includes the subcarrier configuration parameter, and the second information includes at least one of the time parameter of the first period and the total quantity of slots included in the first period.

Specifically, when the configuration information includes a subcarrier configuration parameter corresponding to the first period, the subcarrier configuration parameter may be notified to the terminal device by being included in the first information, namely, first information sent by the network device. The at least one of the time parameter of the first period and the total quantity of slots included in the first period may be included in the second information. The second information may be included in the configuration information. In other words, the terminal device may obtain subcarrier information by using the first information, and obtain the at least one of the time parameter of the first period and the total quantity of slots included in the first period by using the second information. The network device may send the first information and the second information on different resources. For example, the network device may send the first information in a first subframe, and send the second information in a second subframe. Alternatively, the network device may send the first information and the second information in different signaling. Alternatively, the network device may send the first information and the second information in different parts of signaling. In this way, the terminal device may flexibly obtain, in a plurality of manners, configuration information of the subcarrier and information about the first period corresponding to the subcarrier configuration parameter. In this way, flexibility of obtaining the subcarrier configuration parameter by the terminal device is improved, and user experience is improved.

It should be understood that, in this embodiment of this application, the network device may separately notify the terminal device of the first information and the second information by using different signaling. In other words, the first information and the second information may be respectively included in different messages sent by the network device. In this embodiment of this application, the signaling used by the network device to separately notify the first information and the second information is not limited herein.

It should be further understood that, in this embodiment of this application, the network device may notify the terminal device of the first information and the second information in a configuration message. In other words, the network device may notify the terminal device of the first information and the second information by using signaling (that may be, for example, a configuration message). The first information and the second information may be included in a same message sent by the network device.

In one embodiment, configuration information of remaining minimum system information RMSI includes the first information.

Specifically, the network device may send the configuration information of the remaining minimum system information (RMSI) to the terminal device through a physical broadcast channel (PBCH). The configuration information of the RMSI includes information, such as a subcarrier configuration parameter, used for transmitting the RMSI, namely, RMSI-SCS information. The RMSI information is carried in an initial bandwidth part (initial BWP) configured for the PBCH. Therefore, the RMSI-SCS is a subcarrier configuration parameter used by the initial BWP. In one embodiment, other system information (OSI) may use a subcarrier configuration parameter that is the same as the subcarrier configuration parameter used for transmitting the RMSI.

In NR, a correspondence between the subcarrier configuration parameter used for transmitting the RMSI and the first period may be pre-defined. After the terminal device receives the configuration information of the RMSI through the PBCH, or receives OSI, for example, it may be considered, based on the correspondence, that a subcarrier configuration parameter used by the initial BWP, or the RMSI, or the OSI is the subcarrier configuration parameter corresponding to the first period. That is, the configuration information of the RMSI includes the first information. The terminal device may determine, based on the second information and the first information that is included in the configuration information of the RMSI, in other words, based on the second information and the subcarrier configuration parameter that is used by the RMSI, or the subcarrier configuration parameter that is used by the RMSI, or the subcarrier configuration parameter that is used by the OSI, the information about the second period within which the terminal device performs data transmission by using the bandwidth part BWP.

In one embodiment, a synchronization signal block SSB includes the first information.

Specifically, the subcarrier configuration parameter corresponding to the first period may be a subcarrier configuration parameter used (defined) by the synchronization signal block (SSB) sent by the network device. In the NR, a subcarrier configuration parameter used for transmitting the SSB may be pre-defined for different frequency bands, and the terminal device may determine, based on information about a frequency band of the found SSB, a subcarrier parameter corresponding to the transmission of the SSB. In one embodiment, the PBCH may use a subcarrier configuration parameter that is the same as that of the SSB. The terminal device may determine, as the subcarrier parameter corresponding to the first period, a subcarrier configuration parameter used (defined) for transmitting the PBCH or the SSB. In other words, the first information is included in the subcarrier configuration parameter defined by the synchronization signal block SSB sent by the network device. That is, the PBCH or the SSB includes the first information. For example, there may be the following types of information about the frequency band of the SSB:

First type: a subcarrier width is 15 kHz, a bandwidth range of the SSB is 4.32 MHz, and bandwidth is less than 6 GHz;

Second type: a subcarrier width is 30 kHz, a bandwidth range of the SSB is 8.64 MHz, and bandwidth is less than 6 GHz;

Third type: a subcarrier width is 120 kHz, a bandwidth range of the SSB is 34.65 MHz, and bandwidth is greater than 6 GHz; and Fourth type: a subcarrier width is 240 kHz, a bandwidth range of the SSB is 69.12 MHz, and bandwidth is greater than 6 GHz.

The terminal device determines, based on a bandwidth location or frequency band information of the found SSB, the subcarrier configuration parameter used by the SSB. For example, a bandwidth range of an SSB or a PBCH found at a frequency band by the terminal device is within a range of 4.32 MHz, and the terminal device determines that the subcarrier configuration parameter used by the SSB is 15 kHz. The terminal device determines, as the subcarrier configuration parameter corresponding to the first period, the subcarrier configuration parameter (15 kHz) used by the SSB. Then, the terminal device may determine, based on the second information and the subcarrier configuration parameter used by the SSB, the information about the second period within which the terminal device performs data transmission by using the bandwidth part BWP.

In one embodiment, after receiving the at least one of the time parameter of the first period and the total quantity of slots included in the first period, the terminal device may determine, as the subcarrier configuration parameter corresponding to the first period, the configuration parameter that is of the subcarrier and that is pre-defined in a system. For example, the configuration parameter that is of the subcarrier and that is pre-defined in the system may be a time parameter for transmitting the first period and/or a subcarrier configuration parameter of the total quantity of slots included in the first period. In other words, the terminal device may determine, as the subcarrier configuration parameter corresponding to the first period, the time parameter for transmitting the first period and/or the subcarrier configuration parameter of the total quantity of slots included in the first period. For example, the network device sends, in bandwidth that uses a 15 kHz subcarrier, the at least one of the time parameter of the first period and the total quantity of slots included in the first period. Then, the terminal device may determine, according to a pre-defined rule, the 15 kHz as the subcarrier configuration parameter corresponding to the first period. That is, a subcarrier configuration parameter for transmitting the configuration parameter of the first period (for example, the time parameter of the first period and the total quantity of slots included in the first period) is a subcarrier configuration parameter used when a resource is transmitted by using the configuration parameter of the first period. For example, if the configuration parameter of the first period is carried on the PBCH, a subcarrier configuration parameter used by the PBCH corresponding to the first period is a subcarrier configuration parameter used by the SSB/PBCH. If the configuration parameter of the first period is transmitted in RMSI or OSI signaling, the first period corresponds to a subcarrier configuration parameter used by the RMSI/OSI/initial BWP. The terminal device may determine, based on the configuration parameter of the first period and the subcarrier configuration parameter corresponding to the first period, the information about the second period within which the terminal device performs data transmission by using the bandwidth part BWP.

In one embodiment, the information about the second period includes a total quantity of slots included in the second period and/or a time parameter of the second period.

Specifically, the information about the second period may be a total quantity of slots included in one period of a BWP, or a time parameter of a time domain period of a BWP. For example, the time parameter may be a time length, or may be a multiple of a unit time. Alternatively, the information about the second period includes a total quantity of slots included in the second period and a time parameter of the second period. For example, the second period may include: a length of 5 or 10 slots, or a time length of 2.5 ms or 5 ms. Alternatively, the second period may include: a time length of 5 ms, or a time length of 2.5 ms.

It should be understood that, in the embodiments of this application, the time parameter of the first period and/or the time parameter of the second period may include an absolute time length of the first period and/or that of the second period, or may include an uplink-downlink switching period (UL-DL switching periodicity) of the first period and/or that of the second period. A total quantity of slots (total-number-of-slots) and an uplink-downlink switching period (UL-DL switching periodicity) describes a same period of time, and a transformation relationship between the two depends on a size (corresponding to a length of a next slot of the subcarrier spacing) of a subcarrier spacing used by a carrier on which the two are located. Another parameter may be determined by using any two parameters.

For example, for a 15 kHz subcarrier spacing, a length of each slot is 1 ms, and then UL-DL switching periodicity=total-number-of-slots·1 ms. For example, the total quantity of slots is 10, and then a time length of a period is 10 ms, and the uplink-downlink switching period is also 10 ms.

For another example, for a 30 kHz subcarrier spacing, a length of each slot is 0.5 ms, and then UL-DL switching periodicity=total-number-of-slots·0.5 ms. For example, the total quantity of slots is 10, and then a time length of a period is 5 ms, and the uplink-downlink switching period is also 5 ms.

For another example, for a 60 kHz subcarrier spacing, due to a requirement for alignment with 15 kHz at a 0.5 ms granularity and a CP width difference, a length of each slot is not strictly equal. In this case, a length of a minimum slot may be defined to be t, and then total-number-of-slots may be equal to floor (UL-DL switching periodicity/t), where floor is a rounded-down operation.

It should be further understood that, in the embodiments of this application, the uplink-downlink switching period, the time parameter of the first period, and a time unit of the second period may be absolute time units, for example, a millisecond (ms) or a second (s), or may be an integer multiple of a time unit Ts or Tc. The time unit $T_c=1/(\Delta f_{max} \cdot N_f)$, where $\Delta f_{max}=480 \cdot 10^3$, and $N_f=4096$.

A constant $\kappa=T_s/T_c=64$, $T_s=1/(\Delta f_{max} \cdot N_{f,ref})$, $\Delta f_{ref}=15 \cdot 10^3$ Hz, and $N_{f,ref}=2048$.

It should be further understood that, in the embodiments of this application, the configuration information includes a subcarrier configuration parameter (specific-numerology), and may be a value related to a subcarrier feature, for example, may be a sequence number $\mu$. For example, as shown in Table 3, Table 3 is a subcarrier configuration parameter table. A subcarrier bandwidth parameter corresponding to the carrier parameter may be obtained by using a value of $\mu$, thereby obtaining a parameter, such as a time domain width, corresponding to the carrier parameter.

TABLE 3

| Subcarrier configuration parameter table | |
|---|---|
| $\mu$ | $\Delta f = 2^\mu \cdot 15[KHz]$ |
| 0 | 15 |
| 1 | 30 |
| 2 | 60 |
| 3 | 120 |
| 4 | 240 |
| 5 | 480 |

The subcarrier configuration parameter may further be an index n. An SCS supported by the cell includes a [15, 30, 120] kHz subcarrier, and then in an uplink and downlink configuration parameter, n=0 may be used for representing a corresponding 15 k subcarrier, n=1 may be used for representing a corresponding 30 k subcarrier, and n=2 may be used for representing a corresponding 120 k subcarrier.

The subcarrier configuration parameter may further be an identifier k. For example, in a frequency band lower than 6 GHz, k=0 is used for representing a corresponding 15 k subcarrier, and k=1 is used for representing a corresponding 30 k subcarrier. In a frequency band higher than 6 GHz, k=0 is used for representing a corresponding 60 k subcarrier, and k=1 is used for representing a corresponding 120 k subcarrier.

It should be further understood that, the subcarrier configuration parameter may further be in another form or include another parameter related to a subcarrier feature. This is not limited in this embodiment of this application herein.

In one embodiment, if for the BWP, the data transmission is performed by using the subcarrier configuration parameter, the time parameter of the second period is the time parameter of the first period, and the total quantity of slots included in the second period is the total quantity of slots included in the first period. In other words, the terminal device may use the time parameter of the first period as the time parameter of the second period, and use the total quantity of slots included in the first period as the total quantity of slots included in the second period.

Specifically, that for the BWP, that the data transmission is performed by using the subcarrier configuration parameter included in the configuration information may be understood as: For example, it is assumed that the subcarrier configuration parameter included in the configuration information is 30 kHz, and the time parameter of the first period is: a period corresponding to a 30 kHz subcarrier is 2.5 ms, and the total quantity of slots included in the first period is five. That is, a BWP used by the terminal device uses a configuration subcarrier parameter that is 30 kHz, the time parameter of the second period corresponding to the BWP is 2.5 ms, and the total quantity of slots included in the second period is also five. That is, the terminal device performs data transmission by using the subcarrier configuration parameter included in the configuration information. That is, when the terminal device performs data transmission by using the configuration parameter included in the configuration information, the configuration parameter (for example, the time parameter of the first period or the total quantity of slots included in the first period) included in the configuration information is a configuration parameter (for example, the time parameter of the second period or the total quantity of slots included in the second period) of a time domain resource used by the terminal device to perform data transmission.

In one embodiment, the configuration information further includes a transmission configuration status within the first period.

Figure 5:
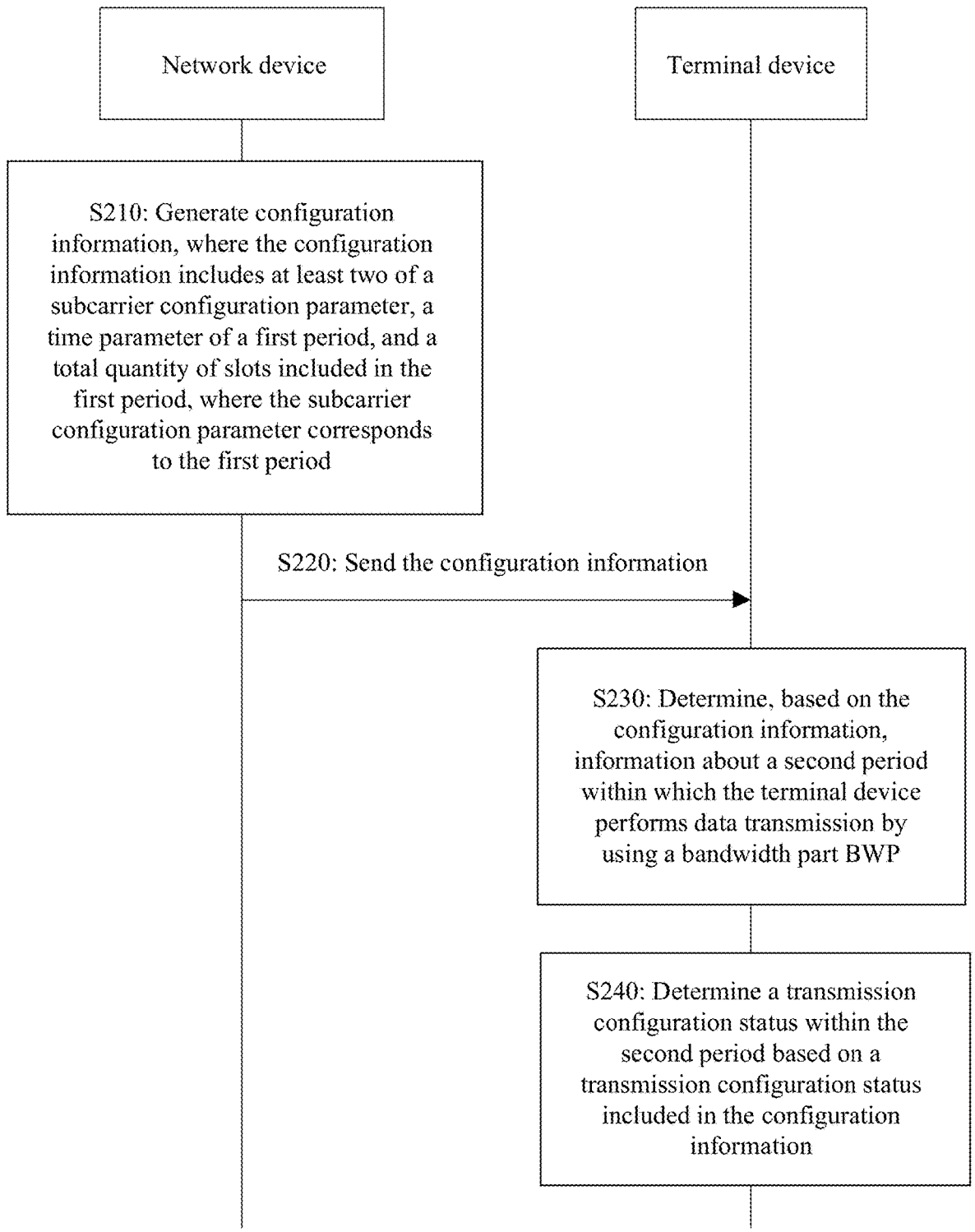
FIG. 5 is a schematic flowchart of an indication method according to another embodiment of this application.

As shown in FIG. 5, the method 200 further includes the following operation:

S240: The terminal device determines a transmission configuration status within the second period based on a transmission configuration status that is of the first period and that is included in the configuration information.

Specifically, the configuration information not only may include the time parameter of the first period and the total quantity of slots included in the first period, but also may include the transmission configuration status within the first period. The transmission configuration status may include: at least one of a downlink slot quantity (number-of-DL-slots), an uplink slot quantity (number-of-UL-slots), an uplink symbol quantity (number-of-UL-symbols), and a downlink symbol quantity (number-of-DL-symbols). In addition, a sequence of uplink and downlink symbols may be stipulated in advance. A possible sequence is that, within a period, symbols are sorted in a sequence of DL-Unknown-UL, and a value of a quantity of symbols may be 0. All symbols in a DL slot are DL symbols, and all symbols in an UL slot are UL symbols. For example, as shown in FIG. 2, the first period includes eight slots, and each slot includes 14 symbols. In this case, the transmission configuration status within the first period may include: the first four slots are used for downlink transmission, in other words, the downlink slot quantity (number-of-DL-slots) is four; the last three slots are used for uplink transmission, in other words, the uplink slot quantity (number-of-UL-slots) is 3; the fifth slot is an unknown slot, and in an unknown slot, the first 10 symbols are used for downlink transmission, in other words, the downlink symbol quantity (number-of-DL-symbols) is 10, the last two symbols are used for uplink transmission, in other words, the uplink symbol quantity (number-of-UL-symbols) is two, and the remaining two symbols are unknown symbols. The terminal device does not perform data transmission on the unknown symbols.

In S240, the terminal device determines the transmission configuration status within the second period based on the transmission configuration status included in the configuration information. In one embodiment, after determining the transmission configuration status within the first period based on the transmission configuration status included in the configuration information, the terminal device may determine the transmission configuration status within the second period based on a relationship between the transmission configuration status within the first period and the transmission configuration status within the second period. For example, the transmission configuration status within the second period may include: a downlink slot quantity, an uplink slot quantity, an uplink symbol quantity, a downlink symbol quantity, and the like within the second period. After determining the transmission configuration status within the second period, the terminal device may perform corresponding uplink and downlink transmission on a corresponding slot or symbol.

In one embodiment, if for the BWP, the data transmission is performed by using the subcarrier configuration parameter, the time parameter of the second period is the time parameter of the first period, the total quantity of slots included in the second period is the total quantity of slots included in the first period, and the transmission configuration status within the second period is consistent with the transmission configuration status within the first period.

Specifically, that for the BWP, that the data transmission is performed by using the subcarrier configuration parameter included in the configuration information may be understood as: For example, it is assumed that the subcarrier configuration parameter included in the configuration information is 30 kHz, and the time parameter of the first period is: a period corresponding to a 30 kHz subcarrier is 2.5 ms. The BWP used by the terminal device uses a configuration subcarrier parameter that is 30 kHz, in other words, the terminal device performs data transmission by using the subcarrier configuration parameter included in the configuration information. The terminal device may determine that the first period includes five slots, and each slot includes 14 symbols. In this case, the transmission configuration status within the first period is: the first three slots are used for downlink transmission, in other words, the downlink slot quantity (number-of-DL-slots) is three; the last one slot is used for uplink transmission, in other words, the uplink slot quantity (number-of-UL-slots) is one; in the fourth slot, the first 10 symbols are used for downlink transmission, the downlink symbol quantity (number-of-DL-symbols) is 10, the last two symbols are used for uplink transmission, in other words, the uplink symbol quantity (number-of-UL-symbols) is two, and the remaining two symbols are unknown symbols. The terminal device does not perform data transmission on the unknown symbols. In this case, a value of the second period is a value of the first period, in other words, a time length of the second period is 2.5 ms. The total quantity of slots included in the second period is the total quantity of slots within the first period, in other words, the total quantity of slots within the second period is five. In addition, the transmission configuration status within the second period is consistent with the transmission configuration status within the first period, in other words, the transmission configuration status within the second period is: in five slots within the second period, the first three slots are used for downlink transmission, in other words, the downlink slot quantity (number-of-DL-slots) is three; the last one slot is used for uplink transmission, in other words, the uplink slot quantity (number-of-UL-slots) is one; in the fourth slot, the first 10 symbols are used for downlink transmission, the downlink symbol quantity (number-of-DL-symbols) is 10, the last two symbols are used for uplink transmission, in other words, the uplink symbol quantity (number-of-UL-symbols) is two, and the remaining two symbols are unknown symbols. The terminal device does not perform data transmission on the unknown symbols.

In one embodiment, if for the BWP, the data transmission is performed by using the subcarrier configuration parameter as a configuration parameter of a reference subcarrier, the time parameter of the second period is the time parameter of the first period, and the total quantity of slots included in the second period has a multiple relationship with the total quantity of slots included in the first period.

Specifically, that for the BWP, that the data transmission is performed by using, as the configuration parameter of the reference subcarrier, the subcarrier configuration parameter included in the configuration information may be understood as: For example, it is assumed that the subcarrier configuration parameter included in the configuration information is 30 kHz, and the time parameter of the first period is: a period corresponding to a 30 kHz subcarrier is 2.5 ms, and the total quantity of slots included in the first period is five. The subcarrier configuration parameter of the BWP used by the terminal device is 60 kHz. That is, the subcarrier configuration parameter included in the configuration information is the configuration parameter of the reference subcarrier. Herein, the configuration parameter of the reference subcarrier is used as a reference. A subcarrier period configuration parameter of the BWP used by the terminal device may be determined by using a period configuration parameter of the reference subcarrier. In this case, the configuration parameter of the reference subcarrier (the time parameter of the first period, or the total quantity of slots included in the first period) included in the configuration information is used as a reference. Due to a symbol alignment principle, within a period of a same time length, a transmission status of each symbol on an SCS of the BWP used by the terminal device is the same as a transmission status of a symbol on the reference subcarrier at a same time point. Therefore, the time parameter, of the first period, that corresponds to the reference subcarrier and that is included in the configuration information is a time parameter (the time parameter of the second period) of a time domain resource used by the terminal device to perform data transmission by using the BWP. The total quantity, of slots included in the first period, that corresponds to the reference subcarrier and that is included in the configuration information has a multiple relationship with the total quantity of slots included in the second period of a time domain resource used by the terminal device to perform data transmission by using the BWP. For example, the time parameter of the first period is: a period corresponding to a 30 kHz subcarrier is 2.5 ms, and the total quantity of slots included in the first period is five. The time parameter of the second period is: a period corresponding to a 60 kHz subcarrier is 2.5 ms, and the total quantity of slots included in the second period is 10.

In one embodiment, if for the BWP, the data transmission is performed by using the subcarrier configuration parameter as a configuration parameter of a reference subcarrier, the time parameter of the second period is the time parameter of the first period, the total quantity of slots included in the second period has a multiple relationship with the total quantity of slots included in the first period, and within any same time segment, the transmission configuration status within the second period is consistent with the transmission configuration status within the first period.

Specifically, the terminal device may determine, as the configuration parameter of the reference subcarrier, the subcarrier configuration parameter included in the configuration information. In this case, the subcarrier configuration parameter included in the configuration information is the configuration parameter of the reference subcarrier. Herein, the configuration parameter of the reference subcarrier is used as a reference. Another subcarrier configuration parameter may be determined by using the configuration parameter of the reference subcarrier. To be specific, the another subcarrier configuration parameter is calculated by using a correspondence between the another subcarrier configuration parameter and the configuration parameter of the reference subcarrier. Herein, the another subcarrier configuration parameter is referred to as a target subcarrier configuration parameter. In other words, the target subcarrier configuration parameter may be determined by using the configuration parameter of the reference subcarrier. A target subcarrier herein is a subcarrier corresponding to the BWP used by the terminal device. In this case, the value of the first period is a value of a period of the reference subcarrier, and the total quantity of slots included in the first period is a total quantity of slots within the period of the reference subcarrier. The transmission configuration status within the first period is a transmission configuration status within the period of the reference subcarrier. According to a principle of symbol transmission status alignment, within a period of a same time length, that is, within a same time segment (within the time length of the first period or the time length of the second period), the total quantity of slots included in the second period (the total quantity of slots included in the second period for the terminal device) has a multiple relationship with the total quantity of slots in the first period (the total quantity of slots in the period of the reference subcarrier). Due to the principle of symbol transmission status alignment, within the period of the same time length, a transmission status (uplink, downlink, or unknown) of each symbol on a target SCS is required to be the same as the transmission status of the symbol on the reference subcarrier at the same time point. The target SCS herein is an SCS corresponding to the BWP used by the terminal device. The terminal device performs data transmission in the BWP of the target SCS. In other words, a configuration parameter of the target SCS is a configuration parameter of an SCS that the terminal device needs to learn of. Then, the terminal device may determine a transmission status of each symbol on a target SCS (the SCS corresponding to the BWP) according to the principle of symbol transmission status alignment.

Figure 6:
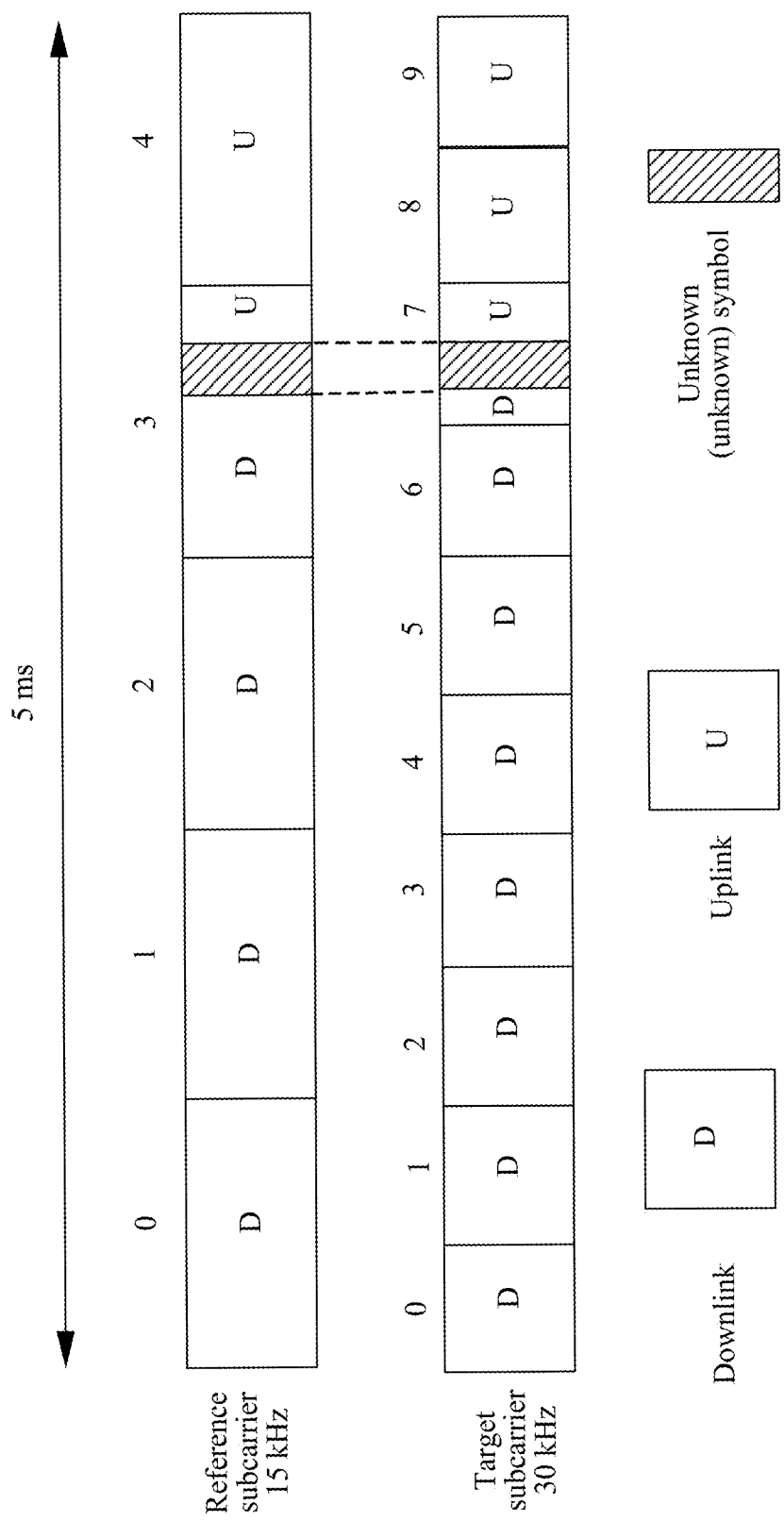
FIG. 6 is a schematic diagram of determining a transmission configuration status of a target subcarrier according to a transmission configuration status of a reference subcarrier according to an embodiment of this application.

For example, FIG. 6 is a schematic diagram of determining a transmission configuration status of a target subcarrier according to a transmission configuration status of a reference subcarrier according to an embodiment of this application. As shown in FIG. 6, it is assumed that a configuration parameter of a 15 kHz subcarrier is used as a configuration parameter of the reference subcarrier. In other words, a time parameter, of a first period, included in configuration information is a time parameter of a period corresponding to the 15 kHz subcarrier. A total quantity, of slots included in the first period, included in the configuration information is a total quantity of slots included in the period corresponding to the 15 kHz subcarrier. An uplink and downlink transmission configuration status, within the first period, included in the configuration information is an uplink and downlink transmission configuration status, within the period of the 15 kHz subcarrier. In FIG. 6, D represents that a transmission direction is downlink, and U represents that the transmission direction is uplink. For example, a transmission configuration status within a period of the reference subcarrier is: total-number-of-slots is 5, and a length of each slot is 1 ms, that is, a time length of the first period is 5 ms. number-of-DL-slots=3, corresponding to slots 0, 1, and 2 in FIG. 6. number-of-DL-symbols=10, corresponding to downlink symbols in a slot 3 in FIG. 6. number-of-UL-symbols=10, corresponding to uplink symbols in a slot 3 in FIG. 6. The slot 3 in FIG. 6 further includes an unknown symbol. number-of-UL-slots=1, corresponding to a slot 4 in FIG. 6. UL-DL switching periodicity=5 ms. If the target subcarrier is (in other words, an SCS corresponding to the BWP is) 30 kHz, based on a symbol alignment principle and a symbol length multiple relationship between different carriers, a time length of each symbol of the 15 kHz subcarrier is twice a time length of each symbol of a 30 Hz subcarrier, that is, one symbol of the 15 kHz subcarrier corresponds to two symbols of the 30 Hz subcarrier. It can be calculated that, within a time segment of 5 ms, an actual period configuration parameter under the 30 kHz (the target subcarrier) is: total-number-of-slots is 10, and a length of each slot is 0.5 ms. number-of-DL-symbols=20, corresponding to downlink symbols in slots 6 and 7 in FIG. 6. number-of-UL-symbols=4, corresponding to uplink symbols in a slot 7 in FIG. 6. number-of-UL-slots=2, corresponding to uplink slots in slots 8 and 9 in FIG. 6. UL-DL switching periodicity=5 ms. Because each slot includes 14 symbols and 20 symbols for downlink transmission may include one complete downlink slot (14 symbols) and six other downlink symbols, a quantity of downlink slots changes to 7, that is, number-of-DL-slots=7. The six downlink symbols herein are downlink symbols in the slot 7 in FIG. 6. The slot 7 in FIG. 6 further includes an unknown symbol. The terminal device may determine, according to the foregoing rule, an uplink and downlink transmission configuration status within a period corresponding to a BWP used by the terminal device. After determining the transmission configuration status within the period of the BWP, the terminal device may perform corresponding uplink and downlink transmission on a corresponding slot or symbol.

It should be understood that, for a case of another SCS corresponding to the BWP used by the terminal device, a transmission configuration status within a period (namely, the second period) of the BWP used by the terminal device to transmit data may be determined by using a method similar to the foregoing method, according to the symbol alignment principle and a relationship between period (namely, the first period) information, of the reference subcarrier, included in the configuration information and the transmission configuration status. This is not limited in this embodiment of this application herein.

In one embodiment, the time length of the first period is $5*2^{-n}$ milliseconds, and n is an integer greater than 0.

Specifically, for different subcarrier width configurations, time lengths of first periods configured by the network device may be different, and one subcarrier configuration parameter may correspond to a plurality of first periods having different lengths. Therefore, the time length T of the first period may be determined by using a formula of T=5*2-n milliseconds, and n is an integer greater than 0. For example, when n=1, the time length of the first period is 2.5 ms. When n=2, the time length of the first period is 1.25 ms. When n=3, the time length of the first period is 0.625 ms. When n=4, the time length of the first period is 0.3125 ms. In other words, the time length of the first period may include a plurality of different values, such as 2.5 ms, 1.25 ms, and 0.625 ms.

It should be understood that, the time length of the first period may further include another value, such as 3 ms or 4 ms. This is not limited in this embodiment of this application herein.

For example, for the 30 kHz subcarrier, the time length of the first period may include 2.5 ms, 2 ms, and 5 ms. For the 30 kHz subcarrier, a time length of each slot is 0.5 ms, in other words, the total quantity of slots included in the first period is: a period length of 2.5 ms includes five slots, and a period length of 5 ms includes 10 slots. A period length of 2 ms includes 4 slots. Table 4 shows a status of supporting several types of signals by subcarriers of the three different period lengths. D represents a downlink slot, U represents an uplink slot, and S represents a special slot.

TABLE 4

| | Status of supporting several types of signals by subcarriers of the three different period lengths | | |
| --- | --- | --- | --- |
| Agreement in the 3rd generation partnership project | 2 ms (four slots) frame structure (DDSU) | 5 ms (10 slots) frame structure (DDDDDDDSUU) | 2.5 ms (five slots) frame structure (DDDSU) |
| Maximum quantity of synchronization signal blocks (synchronization signals/physical broadcast channels) that can be supported: L = 8, corresponding to a 30 kHz SCS | Supporting a maximum of 5 | Supporting a maximum of 8 | Supporting a maximum of 8 |
| Channel state information reference signal transmission period (unit: slot): (5, 10, 20, 40, 80, 160, 320, and 640) | Not supporting some periods: 5, and 10 | Supporting all | Supporting all |
| Channel state information report period (unit: slot): (5, 10, 20, 40, 80, 160, and 320) | Not supporting some periods: 5, and 10 | Not supporting some periods: 5 | Supporting all |
| Conclusion | Supporting configuration periods with five slots and 10 slots not well | Supporting a configuration period with five slots not well | Supporting all configuration periods |

It can be learned that, a 2.5 ms period can better support parameter configurations of channel state information reference signals and channel state information in the table.

In one embodiment, the total quantity of slots included in the first period is five.

Specifically, for different subcarrier widths, time lengths of configured periods may be different, a time length of each slot is also different. Therefore, for a period of a same time length, different subcarrier configurations include different total quantities of slots. For example, it is assumed that a length of the first period is 5 ms. For a 15 kHz subcarrier spacing, a total quantity of slots included in a period of a 5 ms time is five, and for a 30 kHz subcarrier spacing, the total quantity of slots included in the period of the 5 ms time is 10. When the total quantity of slots included in the first period is five, for the 30 kHz subcarrier spacing, the time length of the first period may be 2.5 ms. For the 15 kHz subcarrier spacing, the time length of the first period is 5 ms. Alternatively, for another subcarrier configuration parameter, such as a 60 kHz, 120 kHz, or 240 kHz subcarrier spacing, the time length of the first period may alternatively be another value.

It should be understood that, the total quantity of slots included in the first period may alternatively be another value, such as 10 or 20. This is not limited in this embodiment of this application herein.

Figure 7:
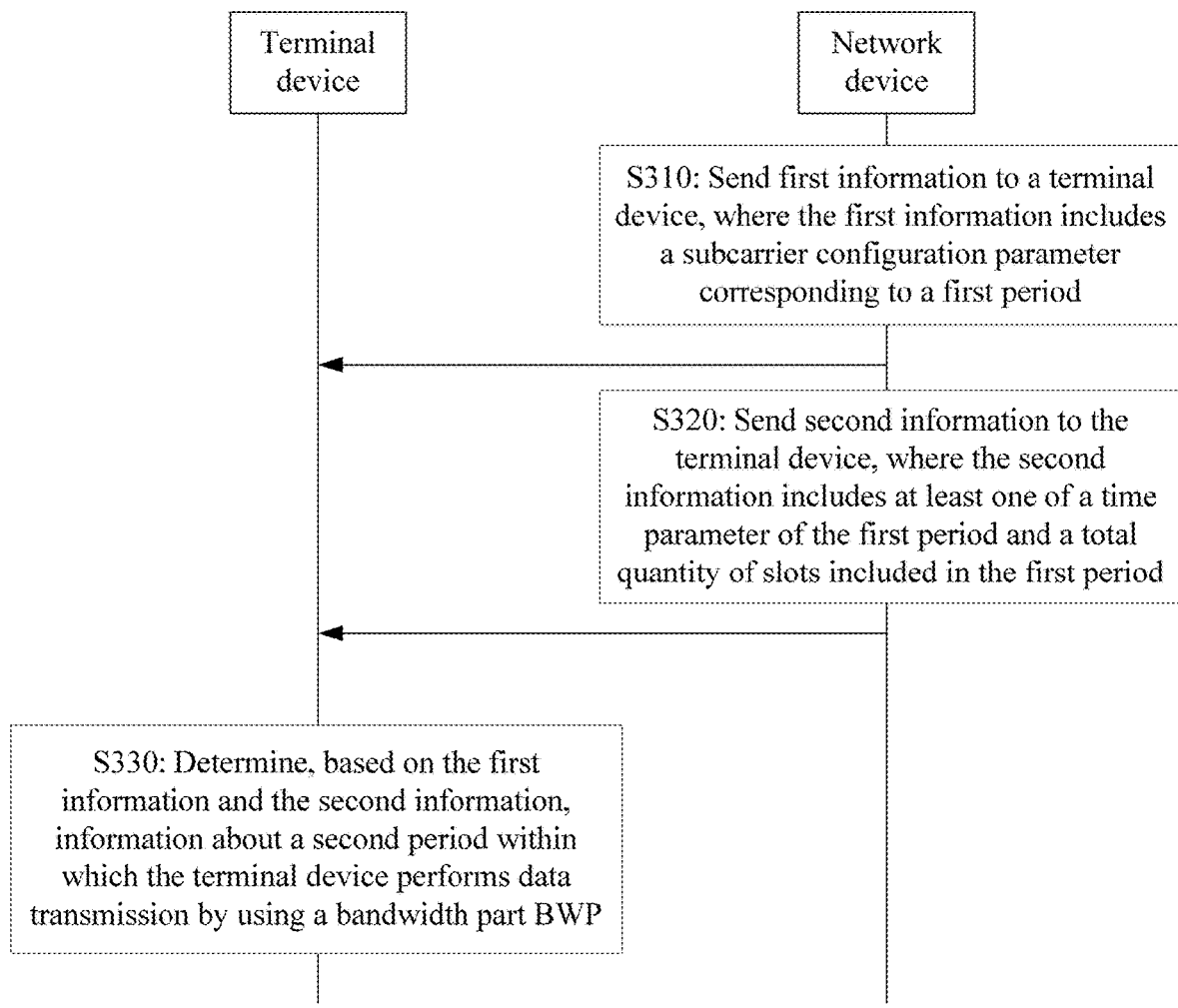
FIG. 7 is a schematic flowchart of an indication method according to another embodiment of this application.

This application further provides an indication method. As shown in FIG. 7, the method 300 includes the following operations:

S310: A network device sends first information to a terminal device, where the first information includes a subcarrier configuration parameter corresponding to a first period. Correspondingly, the terminal device receives the first information.

S320: The network device sends second information to the terminal device, where the second information includes at least one of a time parameter of the first period and a total quantity of slots included in the first period. Correspondingly, the terminal device receives the second information.

S330: The terminal device determines, based on the first information and the second information, information about a second period within which the terminal device performs data transmission by using a bandwidth part BWP.

According to the indication method provided in this embodiment of this application, the network device may use different signaling (the first information and the second information) to notify the terminal device of information about a plurality of SCSs supported by a cell and a configuration period (the first period) parameter corresponding to the plurality of SCSs. After receiving the different signaling, the terminal device may determine, based on a subcarrier configuration parameter that is used by the bandwidth part BWP used for transmitting data and that is configured for the terminal device by the network device, information about a period (the information about the second period) within which data transmission is performed by using a BWP, so that the terminal device may transmit data by using the cell. In this way, data transmission efficiency is improved. In addition, the terminal device may flexibly obtain, in a plurality of manners, configuration information of the subcarrier and information about the first period corresponding to the subcarrier configuration parameter. In this way, flexibility of obtaining the subcarrier configuration parameter by the terminal device is improved, and user experience is improved.

In one embodiment, configuration information that is of remaining minimum system information RMSI and that is sent by the network device includes the first information, and the configuration information of the RMSI includes a subcarrier configuration parameter used by the RMSI. Operation S330 includes: determining, by the terminal device, as the subcarrier configuration parameter corresponding to the first period, the subcarrier configuration parameter used by the RMSI; and determining, by the terminal device based on the second information and the subcarrier configuration parameter used by the RMSI, the information about the second period within which the terminal device performs data transmission by using the bandwidth part BWP.

In one embodiment, a synchronization signal block SSB sent by the network device includes the first information. Operation S330 includes: determining, by the terminal device, as the subcarrier configuration parameter corresponding to the first period, a subcarrier configuration parameter used by the synchronization signal block SSB sent by the network device; and determining, by the terminal device based on the second information and the subcarrier configuration parameter used by the SSB, the information about the second period within which the terminal device performs data transmission by using the bandwidth part BWP.

In one embodiment, the information about the second period includes a total quantity of slots included in the second period and/or a time parameter of the second period.

In one embodiment, the second information further includes a transmission configuration status within the first period. The method 300 further includes: determining, by the terminal device, a transmission configuration status within the second period based on the transmission configuration status included in the second information.

In one embodiment, if for the BWP, the data transmission is performed by using the subcarrier configuration parameter, the time parameter of the second period is the time parameter of the first period, and the total quantity of slots included in the second period is the total quantity of slots included in the first period.

In one embodiment, if for the BWP, the data transmission is performed by using the subcarrier configuration parameter, the time parameter of the second period is the time parameter of the first period, the total quantity of slots included in the second period is the total quantity of slots included in the first period, and the transmission configuration status within the second period is consistent with the transmission configuration status within the first period.

In one embodiment, if for the BWP, the data transmission is performed by using the subcarrier configuration parameter as a configuration parameter of a reference subcarrier, the time parameter of the second period is the time parameter of the first period, and the total quantity of slots included in the second period has a multiple relationship with the total quantity of slots included in the first period.

In one embodiment, if for the BWP, the data transmission is performed by using the subcarrier configuration parameter as a configuration parameter of a reference subcarrier, the time parameter of the second period is the time parameter of the first period, the total quantity of slots included in the second period has a multiple relationship with the total quantity of slots included in the first period, and within any same time segment, the transmission configuration status within the second period is consistent with the transmission configuration status within the first period.

In one embodiment, the time length of the first period is $5*2^{-n}$ milliseconds, and n is an integer greater than 0.

In one embodiment, the total quantity of slots included in the first period includes five.

It should be understood that, the foregoing embodiments are similar to the operations in the method 200. For brevity, details are not described herein again.

It should be further understood that, the foregoing descriptions are for helping a person skilled in the art better understand the embodiments of this application, but not for limiting the scope of the embodiments of this application. Apparently, the person skilled in the art may make various equivalent modifications or variations based on the given example in the foregoing. The modifications or variations also fall within the scope of the embodiments of this application.

It should be further understood that, sequence numbers of the foregoing processes do not mean execution sequences. The execution sequences of the processes should be determined according to functions and internal logic of the processes, and should not be construed as any limitation on the embodiments of this application.

The foregoing describes the indication method in the embodiments of this application in detail with reference to FIG. 1 to FIG. 7. The following describes a communications apparatus in the embodiments of this application in detail with reference to FIG. 8 to FIG. 15.

Figure 8:
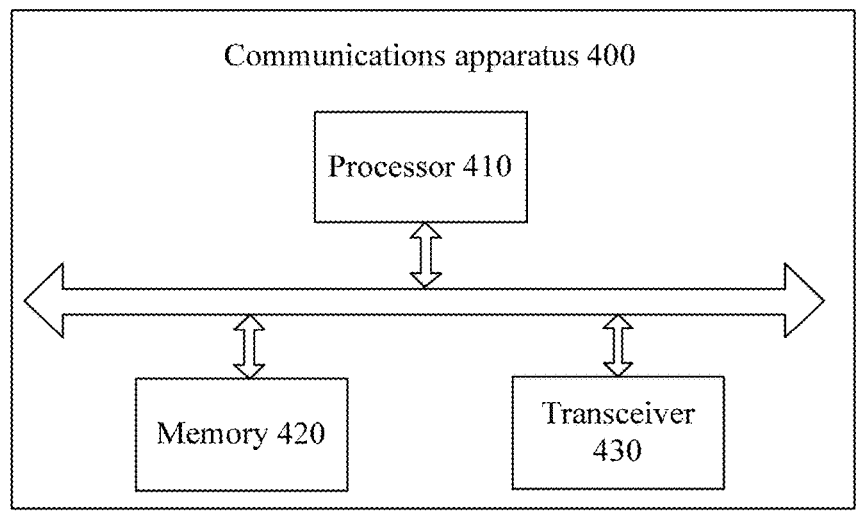
FIG. 8 is a schematic block diagram of a communications apparatus according to an embodiment of this application.

FIG. 8 is a schematic block diagram of a communications apparatus according to an embodiment of this application. It should be understood that, the communications apparatus may be the foregoing communications apparatus, and communications apparatus embodiments mutually correspond to the method embodiments. For similar descriptions, refer to the method embodiments. The communications apparatus 400 shown in FIG. 8 may be configured to perform the corresponding operations performed by the terminal device in FIG. 4 and FIG. 5. The communications apparatus 400 includes: a processor 410, a memory 420, and a transceiver 430. The processor 410, the memory 420, and the transceiver 430 are in communication connection to each other. The memory 420 stores an instruction. The processor 410 is configured to execute the instruction stored in the memory 420. The transceiver 430 is configured to be driven by the processor 410 to perform specific signal receiving and sending.

The transceiver 430 is configured to receive configuration information sent by a network device, where the configuration information includes at least two of a subcarrier configuration parameter, a time parameter of a first period, and a total quantity of slots included in the first period, where the subcarrier corresponds to the first period.

The processor 410 is configured to determine, based on the configuration information, information about a second period within which the terminal device performs data transmission by using a bandwidth part BWP.

According to the communications apparatus provided in this application, the network device may notify the communications apparatus of information about a plurality of SCSs supported by a cell or a configuration period (the first period) parameter corresponding to the plurality of SCSs. After receiving the configuration information, the communications apparatus may determine, based on the configuration information and based on a subcarrier configuration parameter that is used by the BWP used for transmitting data and that is configured for the terminal device by the network device, information about a period (the information about the second period) within which data transmission is performed by using a BWP, so that the terminal device may transmit data by using the cell. In this way, data transmission efficiency is improved and user experience is improved.

Components in the communications apparatus 400 are in communication connection to each other, to be specific, the processor 410, the memory 420, and the transceiver 430 communicate with each other over an internal connection path, to transmit a control and/or data signal. The foregoing method embodiments of this application may be applied to the processor, or the processor implements operations in the foregoing method embodiments. The processor may be an integrated circuit chip and has a signal processing capability. In one embodiment, operations in the foregoing method embodiments can be implemented by using a hardware integrated logical circuit in the processor, or by using instructions in a form of software. The processor may be a central processing unit (CPU), a network processor (NP), a combination of a CPU and an NP, a digital signal processor (DSP), an application-specific integrated circuit (ASIC), a field programmable gate array (FPGA), another programmable logic device, a discrete gate, a transistor logic device, or a discrete hardware component. It may implement or perform the methods, the operations, and logical block diagrams that are disclosed in this application. The general purpose processor may be a microprocessor, or the processor may be any conventional processor or the like. Operations of the methods disclosed in this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

In one embodiment of this application, the configuration information includes first information and second information, the first information includes the subcarrier configuration parameter, and the second information includes at least one of the time parameter of the first period and the total quantity of slots included in the first period.

In one embodiment of this application, configuration information that is of remaining minimum system information RMSI and that is sent by the network device includes the first information.

In one embodiment of this application, a synchronization signal block SSB sent by the network device includes the first information.

In one embodiment of this application, the information about the second period includes a total quantity of slots included in the second period and/or a time parameter of the second period.

In one embodiment of this application, the configuration information further includes a transmission configuration status within the first period; and the processor 410 is further configured to determine a transmission configuration status within the second period based on the transmission configuration status included in the configuration information.

In one embodiment of this application, if for the BWP, the data transmission is performed by using the subcarrier configuration parameter, the time parameter of the second period is the time parameter of the first period, and the total quantity of slots included in the second period is the total quantity of slots included in the first period.

In one embodiment of this application, if for the BWP, the data transmission is performed by using the subcarrier configuration parameter, the time parameter of the second period is the time parameter of the first period, the total quantity of slots included in the second period is the total quantity of slots included in the first period, and the transmission configuration status within the second period is consistent with the transmission configuration status within the first period.

In one embodiment of this application, if for the BWP, the data transmission is performed by using the subcarrier configuration parameter as a configuration parameter of a reference subcarrier, the time parameter of the second period is the time parameter of the first period, and the total quantity of slots included in the second period has a multiple relationship with the total quantity of slots included in the first period.

In one embodiment of this application, if for the BWP, the data transmission is performed by using the subcarrier configuration parameter as a configuration parameter of a reference subcarrier, the time parameter of the second period is the time parameter of the first period, the total quantity of slots included in the second period has a multiple relationship with the total quantity of slots included in the first period, and within any same time segment, the transmission configuration status within the second period is consistent with the transmission configuration status within the first period.

In one embodiment of this application, a time length of the first period is $5*2^{-n}$ milliseconds, and n is an integer greater than 0.

In one embodiment of this application, the total quantity of slots included in the first period is five.

Figure 9:
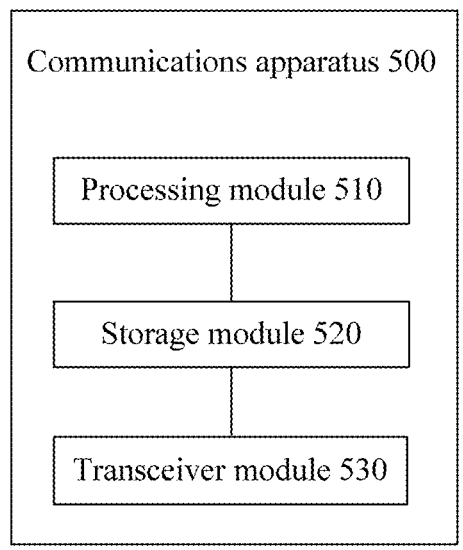
FIG. 9 is a schematic block diagram of a communications apparatus according to another embodiment of this application.

It should be noted that, in this embodiment of this application, the processor 410 may be implemented by a processing module, the memory 420 may be implemented by a storage module, and the transceiver 430 may be implemented by a transceiver module. As shown in FIG. 9, the communications apparatus 500 may include the processing module 510, the storage module 520, and the transceiver module 530.

The communications apparatus 400 shown in FIG. 8 or the communications apparatus 500 shown in FIG. 9 can implement the operations performed by the terminal device in FIG. 4 and FIG. 5 in the foregoing. To avoid repetition, details are not described herein again.

Figure 10:
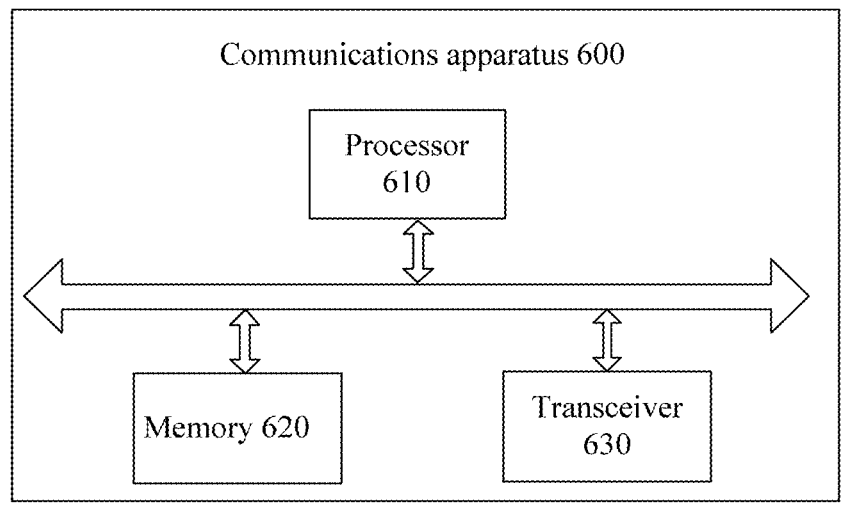
FIG. 10 is a schematic block diagram of a communications apparatus according to an embodiment of this application.

FIG. 10 is a schematic block diagram of a communications apparatus 600 according to an embodiment of this application. It should be understood that, communications apparatus embodiments mutually correspond to the method embodiments. For similar descriptions, refer to the method embodiments. The communications apparatus 600 shown in FIG. 10 may be configured to perform the corresponding operations performed by the network device in FIG. 4 and FIG. 5. As shown in FIG. 10, the communications apparatus 600 includes: a processor 610, a memory 620, and a transceiver 630. The processor 610, the memory 620, and the transceiver 630 are in communication connection to each other. The memory 620 stores an instruction. The processor 610 is configured to execute the instruction stored in the memory 620. The transceiver 630 is configured to be driven by the processor 610 to perform specific signal receiving and sending.

The processor 610 is configured to generate configuration information, where the configuration information includes at least two of a subcarrier configuration parameter, a time parameter of a first period, and a total quantity of slots included in the first period, where the subcarrier corresponds to the first period.

The transceiver 630 is configured to send the configuration information to a terminal device, where the configuration information is used for determining information about a second period within which the terminal device performs data transmission by using a bandwidth part BWP.

According to the communications apparatus provided in this application, the terminal device may be notified of information about a plurality of SCSs supported by a cell or a configuration period (the first period) parameter corresponding to the plurality of SCSs. After receiving the configuration information, the terminal device may determine, based on the configuration information and based on a subcarrier configuration parameter that is used by the BWP used for transmitting data and that is configured for the terminal device by the network device, information about a period (the information about the second period) within which data transmission is performed by using a BWP, so that the terminal device may transmit data by using the cell. In this way, data transmission efficiency is improved and user experience is improved.

Components in the communications apparatus 600 are in communication connection to each other, to be specific, the processor 610, the memory 620, and the transceiver 630 communicate with each other over an internal connection path, to transmit a control and/or data signal. The foregoing method embodiments of this application may be applied to the processor, or the processor implements the operations in the foregoing method embodiments. The processor may be an integrated circuit chip and has a signal processing capability. In one embodiment, operations in the foregoing method embodiments can be implemented by using a hardware integrated logical circuit in the processor, or by using instructions in a form of software. The processor may be a CPU, a network processor NP, a combination of a CPU and an NP, a DSP, an ASIC, an FPGA, another programmable logic device, a discrete gate, a transistor logic device, or a discrete hardware component. It may implement or perform the methods, the operations, and logical block diagrams that are disclosed in this application. The general purpose processor may be a microprocessor, or the processor may be any conventional processor or the like. Operations of the methods disclosed in this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

In one embodiment of this application, the configuration information includes first information and second information, the first information includes the subcarrier configuration parameter, and the second information includes at least one of the time parameter of the first period and the total quantity of slots included in the first period.

In one embodiment of this application, configuration information that is of remaining minimum system information RMSI and that is sent by the network device includes the first information.

In one embodiment of this application, a synchronization signal block SSB sent by the network device includes the first information.

In one embodiment of this application, the information about the second period includes a total quantity of slots included in the second period and/or a time parameter of the second period.

In one embodiment of this application, the configuration information further includes a transmission configuration status within the first period.

In one embodiment of this application, if for the BWP, the data transmission is performed by using the subcarrier configuration parameter, the time parameter of the second period is the time parameter of the first period, the total quantity of slots included in the second period is the total quantity of slots included in the first period, and the transmission configuration status within the second period is consistent with the transmission configuration status within the first period.

In one embodiment of this application, if for the BWP, the data transmission is performed by using the subcarrier configuration parameter, the time parameter of the second period is the time parameter of the first period, and the total quantity of slots included in the second period is the total quantity of slots included in the first period.

In one embodiment of this application, if for the BWP, the data transmission is performed by using the subcarrier configuration parameter as a configuration parameter of a reference subcarrier, the time parameter of the second period is the time parameter of the first period, and the total quantity of slots included in the second period has a multiple relationship with the total quantity of slots included in the first period.

In one embodiment of this application, if for the BWP, the data transmission is performed by using the subcarrier configuration parameter as a configuration parameter of a reference subcarrier, the time parameter of the second period is the time parameter of the first period, the total quantity of slots included in the second period has a multiple relationship with the total quantity of slots included in the first period, and within any same time segment, the transmission configuration status within the second period is consistent with the transmission configuration status within the first period.

In one embodiment of this application, a time length of the first period is $5*2^{-n}$ milliseconds, and n is an integer greater than 0.

In one embodiment of this application, the total quantity of slots included in the first period is five.

Figure 11:
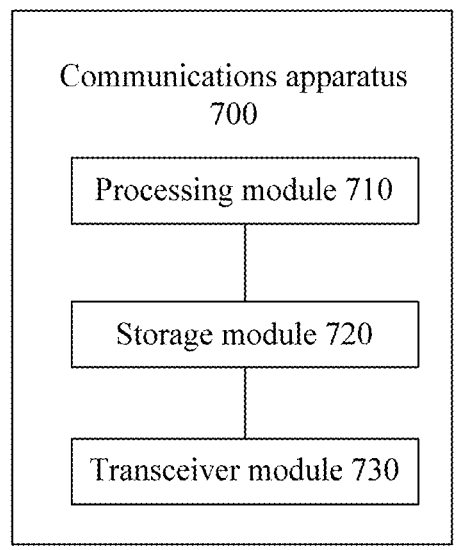
FIG. 11 is a schematic block diagram of a communications apparatus according to another embodiment of this application.

It should be noted that, in this embodiment of the present invention, the processor 610 may be implemented by a processing module, the memory 620 may be implemented by a storage module, and the transceiver 630 may be implemented by a transceiver module. As shown in FIG. 11, a communications apparatus 700 may include a processing module 710, a storage module 720, and a transceiver module 730.

The communications apparatus 600 shown in FIG. 10 or the communications apparatus 700 shown in FIG. 11 can implement the operations performed by the network device in FIG. 4 and FIG. 5 in the foregoing. To avoid repetition, details are not described herein again.

Figure 12:
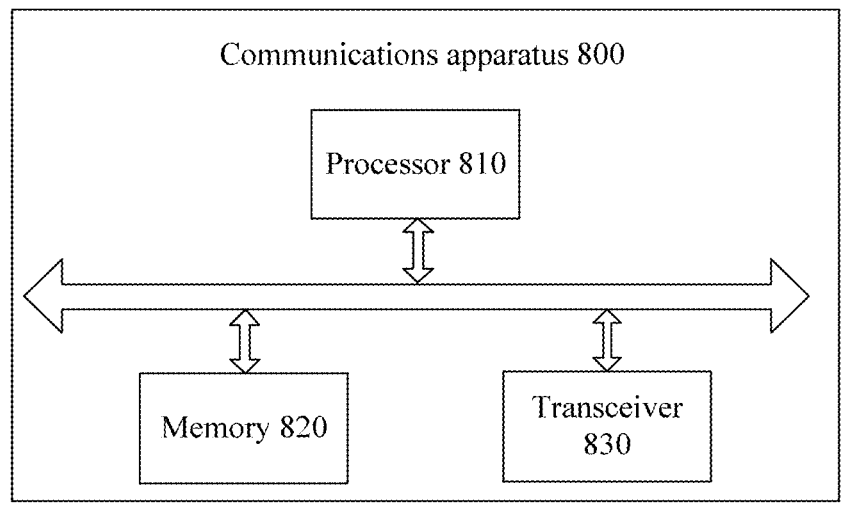
FIG. 12 is a schematic block diagram of a communications apparatus according to an embodiment of this application.

FIG. 12 is a schematic block diagram of a communications apparatus 800 according to an embodiment of this application. It should be understood that, communications apparatus embodiments mutually correspond to the method embodiments. For similar descriptions, refer to the method embodiments. The communications apparatus 800 shown in FIG. 12 may be configured to perform the corresponding operations performed by the terminal device in FIG. 7 or the method 300. As shown in FIG. 12, the communications apparatus 800 includes: a processor 810, a memory 820, and a transceiver 830. The processor 810, the memory 820, and the transceiver 830 are in communication connection to each other. The memory 820 stores an instruction. The processor 810 is configured to execute the instruction stored in the memory 820. The transceiver 830 is configured to be driven by the processor 810 to perform specific signal receiving and sending.

The transceiver 830 is configured to receive first information sent by a network device, where the first information includes a subcarrier configuration parameter corresponding to a first period.

The transceiver 830 is further configured to receive second information sent by the network device, where the second information includes at least one of a time parameter of the first period and a total quantity of slots included in the first period.

The processor 810 is configured to determine, based on the first information and the second information, information about a second period within which the terminal device performs data transmission by using a bandwidth part BWP.

According to the communications apparatus provided in this application, the network device may use different signaling to notify the communications apparatus of information about a plurality of SCSs supported by a cell and a configuration period (the first period) parameter corresponding to the plurality of SCSs. After receiving the different signaling (the first information and the second information), the communications apparatus may determine, based on a subcarrier configuration parameter that is used by the bandwidth part BWP used for transmitting data and that is configured for the communications apparatus by the network device, information about a period (the information about the second period) within which data transmission is performed by using a BWP, so that the communications apparatus may transmit data by using the cell. In this way, data transmission efficiency is improved. In addition, the communications apparatus may flexibly obtain, in a plurality of manners, configuration information of the subcarrier and information about the first period corresponding to the subcarrier configuration parameter. In this way, flexibility of obtaining the subcarrier configuration parameter by the communications apparatus, and user experience is improved.

Components in the communications apparatus 800 are in communication connection to each other, to be specific, the processor 810, the memory 820, and the transceiver 830 communicate with each other over an internal connection path, to transmit a control and/or data signal. The foregoing method embodiments of this application may be applied to the processor, or the processor implements the operations in the foregoing method embodiments. The processor may be an integrated circuit chip and has a signal processing capability. In one embodiment, operations in the foregoing method embodiments can be implemented by using a hardware integrated logical circuit in the processor, or by using instructions in a form of software. The processor may be a CPU, an NP, a combination of a CPU and an NP, a DSP, an ASIC, an FPGA, another programmable logic device, a discrete gate, a transistor logic device, or a discrete hardware component. It may implement or perform the methods, the operations, and logical block diagrams that are disclosed in this application. The general purpose processor may be a microprocessor, or the processor may be any conventional processor or the like. Operations of the methods disclosed in this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

In one embodiment of this application, configuration information that is of remaining minimum system information RMSI and that is sent by the network device includes the first information, and the configuration information of the RMSI includes a subcarrier configuration parameter used by the RMSI. The processor 810 is specifically configured to: determine, by the terminal device, as the subcarrier configuration parameter corresponding to the first period, the subcarrier configuration parameter used by the RMSI;

and determine, by the terminal device based on the second information and the subcarrier configuration parameter used by the RMSI, the information about the second period within which the terminal device performs data transmission by using the bandwidth part BWP.

In one embodiment of this application, a synchronization signal block SSB sent by the network device includes the first information. The processor 810 is specifically configured to: determine, by the terminal device, as the subcarrier configuration parameter corresponding to the first period, the subcarrier configuration parameter used by the synchronization signal block SSB sent by the network device; and determine, by the terminal device based on the second information and the subcarrier configuration parameter used by the SSB, the information about the second period within which the terminal device performs data transmission by using the bandwidth part BWP.

In one embodiment of this application, the information about the second period includes a total quantity of slots included in the second period and/or a time parameter of the second period.

In one embodiment of this application, the second information further includes a transmission configuration status within the first period; and the processor 810 is further configured to determine a transmission configuration status within the second period based on the transmission configuration status included in the second information.

In one embodiment of this application, if for the BWP, the data transmission is performed by using the subcarrier configuration parameter, the time parameter of the second period is the time parameter of the first period, and the total quantity of slots included in the second period is the total quantity of slots included in the first period.

In one embodiment of this application, if for the BWP, the data transmission is performed by using the subcarrier configuration parameter, the time parameter of the second period is the time parameter of the first period, the total quantity of slots included in the second period is the total quantity of slots included in the first period, and the transmission configuration status within the second period is consistent with the transmission configuration status within the first period.

In one embodiment of this application, if for the BWP, the data transmission is performed by using the subcarrier configuration parameter as a configuration parameter of a reference subcarrier, the time parameter of the second period is the time parameter of the first period, and the total quantity of slots included in the second period has a multiple relationship with the total quantity of slots included in the first period.

In one embodiment of this application, if for the BWP, the data transmission is performed by using the subcarrier configuration parameter as a configuration parameter of a reference subcarrier, the time parameter of the second period is the time parameter of the first period, the total quantity of slots included in the second period has a multiple relationship with the total quantity of slots included in the first period, and within any same time segment, the transmission configuration status within the second period is consistent with the transmission configuration status within the first period.

In one embodiment of this application, a time length of the first period is $5*2^{-n}$ milliseconds, and n is an integer greater than 0.

In one embodiment of this application, the total quantity of slots included in the first period is five.

Figure 13:
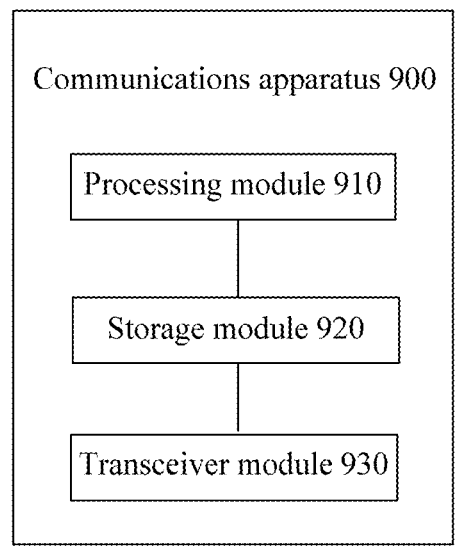
FIG. 13 is a schematic block diagram of a communications apparatus according to another embodiment of this application.

It should be noted that, in this embodiment of this application, the processor 810 may be implemented by a processing module, the memory 820 may be implemented by a storage module, and the transceiver 830 may be implemented by a transceiver module. As shown in FIG. 13, a communications apparatus 900 may include a processing module 910, a storage module 920, and a transceiver module 930.

The communications apparatus 800 shown in FIG. 12 or the communications apparatus 900 shown in FIG. 13 can implement the operations performed by the terminal device in FIG. 7 or the method 300 in the foregoing. To avoid repetition, details are not described herein again.

Figure 14:
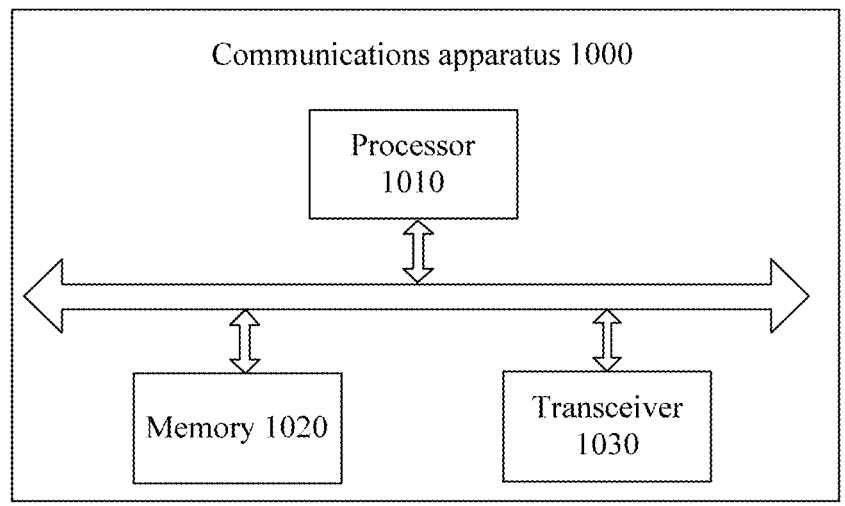
FIG. 14 is a schematic block diagram of a communications apparatus according to an embodiment of this application.

FIG. 14 is a schematic block diagram of a communications apparatus 1000 according to an embodiment of this application. It should be understood that, communications apparatus embodiments mutually correspond to the method embodiments. For similar descriptions, refer to the method embodiments. The communications apparatus 1000 shown in FIG. 14 may be configured to perform the corresponding operations performed by the network device in FIG. 7 or the method 300. As shown in FIG. 14, the communications apparatus 1000 includes: a processor 1010, a memory 1020, and a transceiver 1030. The processor 1010, the memory 1020, and the transceiver 1030 are in communication connection to each other. The memory 1020 stores an instruction. The processor 1010 is configured to execute the instruction stored in the memory 1020. The transceiver 1030 is configured to be driven by the processor 1010 to perform specific signal receiving and sending.

The transceiver 1030 is configured to send first information to a terminal device, where the first information includes a subcarrier configuration parameter corresponding to a first period.

The transceiver 1030 is further configured to send second information to the terminal device, where the second information includes at least one of a time parameter of the first period and a total quantity of slots included in the first period. The first message and the second message are used by the terminal device to determine information about a second period within which the terminal device performs data transmission by using a bandwidth part BWP.

According to the communications apparatus provided in this application, different signaling (the first information and the second information) may be used to notify the terminal device of information about a plurality of SCSs supported by a cell and a configuration period (the first period) parameter corresponding to the plurality of SCSs. After receiving the different signaling, the terminal device may determine, based on a subcarrier configuration parameter that is used by the bandwidth part BWP used for transmitting data and that is configured for the terminal device by the communications apparatus, information about a period (the information about the second period) within which data transmission is performed by using a BWP, so that the terminal device may transmit data by using the cell. In this way, data transmission efficiency is improved. In addition, the terminal device may flexibly obtain, in a plurality of manners, configuration information of the subcarrier and information about the first period corresponding to the subcarrier configuration parameter. In this way, flexibility of obtaining the subcarrier configuration parameter by the terminal device is improved, and user experience is improved.

Components in the communications apparatus 1000 are in communication connection to each other, to be specific, the processor 1010, the memory 1020, and the transceiver 1030 communicate with each other over an internal connection path, to transmit a control and/or data signal. The foregoing method embodiments of this application may be applied to the processor, or the processor implements the operations of the foregoing method embodiments. The processor may be an integrated circuit chip and has a signal processing capability. In one embodiment, operations in the foregoing method embodiments can be implemented by using a hardware integrated logical circuit in the processor, or by using instructions in a form of software. The processor may be a CPU, a network processor NP, a combination of a CPU and an NP, a DSP, an ASIC, an FPGA, another programmable logic device, a discrete gate, a transistor logic device, or a discrete hardware component. It may implement or perform the methods, the operations, and logical block diagrams that are disclosed in this application. The general purpose processor may be a microprocessor, or the processor may be any conventional processor or the like. Operations of the methods disclosed in this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

In one embodiment of this application, configuration information that is of remaining minimum system information RMSI and that is sent by the network device includes the first information, and the configuration information of the RMSI includes a subcarrier configuration parameter used by the RMSI.

In one embodiment of this application, a synchronization signal block SSB sent by the network device includes the first information.

In one embodiment of this application, the information about the second period includes a total quantity of slots included in the second period and/or a time parameter of the second period.

In one embodiment of this application, the second information further includes a transmission configuration status within the first period.

In one embodiment of this application, if for the BWP, the data transmission is performed by using the subcarrier configuration parameter, the time parameter of the second period is the time parameter of the first period, the total quantity of slots included in the second period is the total quantity of slots included in the first period, and the transmission configuration status within the second period is consistent with the transmission configuration status within the first period.

In one embodiment of this application, if for the BWP, the data transmission is performed by using the subcarrier configuration parameter, the time parameter of the second period is the time parameter of the first period, and the total quantity of slots included in the second period is the total quantity of slots included in the first period.

In one embodiment of this application, if for the BWP, the data transmission is performed by using the subcarrier configuration parameter as a configuration parameter of a reference subcarrier, the time parameter of the second period is the time parameter of the first period, and the total quantity of slots included in the second period has a multiple relationship with the total quantity of slots included in the first period.

In one embodiment of this application, if for the BWP, the data transmission is performed by using the subcarrier configuration parameter as a configuration parameter of a reference subcarrier, the time parameter of the second period is the time parameter of the first period, the total quantity of slots included in the second period has a multiple relationship with the total quantity of slots included in the first period, and within any same time segment, the transmission configuration status within the second period is consistent with the transmission configuration status within the first period.

In one embodiment of this application, a time length of the first period is $5*2^{-n}$ milliseconds, and n is an integer greater than 0.

In one embodiment of this application, the total quantity of slots included in the first period is five.

Figure 15:
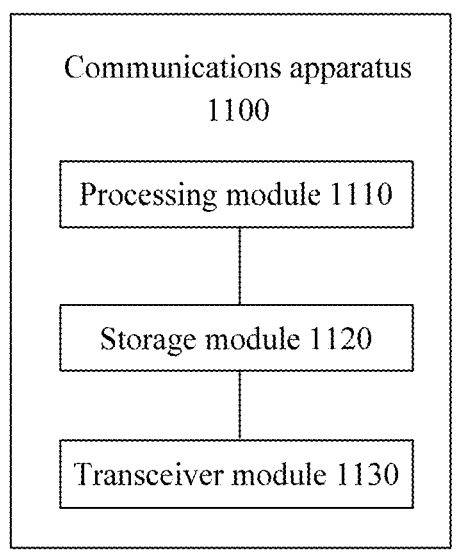
FIG. 15 is a schematic block diagram of a communications apparatus according to another embodiment of this application.

It should be noted that, in this embodiment of this application, the processor 1010 may be implemented by a processing module, the memory 1020 may be implemented by a storage module, and the transceiver 1030 may be implemented by a transceiver module. As shown in FIG. 15, a communications apparatus 1100 may include a processing module 1110, a storage module 1120, and a transceiver module 1130.

The communications apparatus 1000 shown in FIG. 14 or the communications apparatus 1100 shown in FIG. 15 can implement the operations performed on a network in FIG. 7 or the method 300 in the foregoing. To avoid repetition, details are not described herein again.

An embodiment of this application further provides a computer readable medium, configured to store computer program code. The computer program includes an instruction used for performing the indication method according to the embodiments of this application in FIG. 4, FIG. 5, and FIG. 7. The readable medium may be a read-only memory (ROM) or a random access memory (RAM). This is not limited in this embodiment of this application.

An embodiment of this application further provides a communications system. The communications system includes the communications apparatus provided in the foregoing embodiments of this application. The communications system may perform any indication method provided in the embodiments of this application.

An embodiment of this application further provides a system chip. The system chip includes: a processing unit and a communications unit. The processing unit, for example, may be a processor, and the communications unit, for example, may be an input/output interface, a pin, or a circuit. The processing unit may execute a computer instruction, so that a chip in the terminal performs a method for data transmission over a direct link according to any item in the first aspect.

In one embodiment, the computer instruction is stored in a storage unit.

In one embodiment, the storage unit is a storage unit, such as a register or a cache, in the chip. The storage unit may alternatively be a storage unit that is inside the terminal and outside the chip, for example, a ROM, or another type of static storage device, such as a RAM, that can store static information or a static instruction. The processor mentioned anywhere in the foregoing may be a CPU, a microprocessor, an ASIC, or one or more integrated circuits configured to control program execution in the foregoing indication method.

It should be understood that the terms "and/or" and "at least one of A or B" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in some embodiments. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An indication method, comprising:
   receiving, by a terminal device, configuration information sent by a network device, wherein the configuration information comprises at least two of a subcarrier configuration parameter, a time parameter of a first period, and a total quantity of slots comprised in the first period, wherein the subcarrier configuration parameter corresponds to the first period; and
   determining, by the terminal device based on the configuration information, information about a second period within which the terminal device performs data transmission by using a bandwidth part (BWP).

2. The method according to claim 1, wherein the subcarrier configuration parameter is used for indicating a subcarrier spacing, and the time parameter of the first period is used for indicating a time length of the first period.

3. The method according to claim 2, wherein the time length of the first period belongs to a time length set of the first period, and the time length set of the first period comprises one or more time lengths corresponding to the subcarrier spacing.

4. The method according to claim 1, wherein the configuration information comprises first information and second information, the first information comprises the subcarrier configuration parameter, and the second information comprises at least one of the time parameter of the first period and the total quantity of slots comprised in the first period.

5. The method according to claim 4, wherein configuration information of remaining minimum system information RMSI comprises the first information.

6. The method according to claim 4, wherein a synchronization signal block SSB comprises the first information.

7. The method according to claim 1, wherein the information about the second period comprises a total quantity of slots comprised in the second period and/or a time parameter of the second period.

8. The method according to claim 1, wherein the configuration information further comprises a transmission configuration status within the first period; and
   the method further comprises:
   determining, by the terminal device, a transmission configuration status within the second period based on the transmission configuration status comprised in the configuration information.

9. The method according to claim 1, wherein if for the BWP, the data transmission is performed by using the subcarrier configuration parameter, the time parameter of the second period is the time parameter of the first period, and the total quantity of slots comprised in the second period is the total quantity of slots comprised in the first period.

10. The method according to claim 8, wherein if for the BWP, the data transmission is performed by using the subcarrier configuration parameter, the time parameter of the second period is the time parameter of the first period, the total quantity of slots comprised in the second period is the total quantity of slots comprised in the first period, and the transmission configuration status within the second period is consistent with the transmission configuration status within the first period.

11. The method according to claim 1, wherein if for the BWP, the data transmission is performed by using the subcarrier configuration parameter as a configuration parameter of a reference subcarrier, the time parameter of the second period is the time parameter of the first period, and the total quantity of slots comprised in the second period has a multiple relationship with the total quantity of slots comprised in the first period.

12. The method according to claim 8, wherein if for the BWP, the data transmission is performed by using the subcarrier configuration parameter as a configuration parameter of a reference subcarrier, the time parameter of the second period is the time parameter of the first period, the total quantity of slots comprised in the second period has a multiple relationship with the total quantity of slots comprised in the first period, and within any same time segment, the transmission configuration status within the second period is consistent with the transmission configuration status within the first period.

13. The method according to claim 1, wherein a time length of the first period is $5*2^{-n}$ milliseconds, and n is an integer greater than 0.

14. The method according to claim 13, wherein
the time length of the first period is 1.25 milliseconds; or
the time length of the first period is 0.625 millisecond.

15. The method according to claim 1, wherein the total quantity of slots comprised in the first period comprises five.

16. The method according to claim 8, wherein the transmission configuration status comprises: at least one of a downlink slot quantity, an uplink slot quantity, an uplink symbol quantity, and a downlink symbol quantity.

17. A communications apparatus, comprising:
a processor; and
a memory, wherein the processor is connected to the memory, the memory is configured to store an instruction, and the processor is configured to execute the instruction stored in the memory, to implement an indication method comprising:
receiving, by a terminal device, configuration information sent by a network device, wherein the configuration information comprises at least two of a subcarrier configuration parameter, a time parameter of a first period, and a total quantity of slots comprised in the first period, wherein the subcarrier configuration parameter corresponds to the first period; and
determining, by the terminal device based on the configuration information, information about a second period within which the terminal device performs data transmission by using a bandwidth part (BWP).

18. The communications apparatus according to claim 17, wherein the subcarrier configuration parameter is used for indicating a subcarrier spacing, and the time parameter of the first period is used for indicating a time length of the first period.

19. The communications apparatus according to claim 18, wherein the time length of the first period belongs to a time length set of the first period, and the time length set of the first period comprises one or more time lengths corresponding to the subcarrier spacing.

20. A computer readable storage medium, configured to store a computer program, wherein the computer program is configured to execute an instruction for an indication method, the method comprising:

receiving, by a terminal device, configuration information sent by a network device, wherein the configuration information comprises at least two of a subcarrier configuration parameter, a time parameter of a first period, and a total quantity of slots comprised in the first period, wherein the subcarrier configuration parameter corresponds to the first period; and
determining, by the terminal device based on the configuration information, information about a second period within which the terminal device performs data transmission by using a bandwidth part (BWP).

21. An indication method, comprising:
generating, by a network device, configuration information, wherein the configuration information comprises at least two of a subcarrier configuration parameter, a time parameter of a first period, and a total quantity of slots comprised in the first period, wherein the subcarrier configuration parameter corresponds to the first period; and
sending, by the network device, the configuration information to a terminal device, wherein the configuration information is used for determining information about a second period within which the terminal device performs data transmission by using a bandwidth part (BWP).

22. The method according to claim 21, wherein the subcarrier configuration parameter is used for indicating a subcarrier spacing, and the time parameter of the first period is used for indicating a time length of the first period.

23. The method according to claim 22, wherein the time length of the first period belongs to a time length set of the first period, and the time length set of the first period comprises one or more time lengths corresponding to the subcarrier spacing.

24. The method according to claim 21, wherein the configuration information comprises first information and second information, the first information comprises the subcarrier configuration parameter, and the second information comprises at least one of the time parameter of the first period or the total quantity of slots comprised in the first period.

25. The method according to claim 24, wherein configuration information of remaining minimum system information (RMSI) and sent by the network device comprises the first information.

26. The method according to claim 24, wherein a synchronization signal block (SSB) sent by the network device comprises the first information.

27. The method according to claim 21, wherein the information about the second period comprises at least one of a total quantity of slots comprised in the second period or a time parameter of the second period.

28. The method according to claim 21, wherein the configuration information further comprises a transmission configuration status within the first period.

29. The method according to claim 21, wherein if for the BWP, the data transmission is performed by using the subcarrier configuration parameter, a time parameter of the second period is identical to the time parameter of the first period, and a total quantity of slots comprised in the second period is identical to the total quantity of slots comprised in the first period.

30. The method according to claim 28, wherein if for the BWP, the data transmission is performed by using the subcarrier configuration parameter, a time parameter of the second period is identical to the time parameter of the first period, a total quantity of slots comprised in the second period is identical to the total quantity of slots comprised in the first period, and a transmission configuration status within the second period is consistent with the transmission configuration status within the first period.

31. The method according to claim 21, wherein if for the BWP, the data transmission is performed by using the subcarrier configuration parameter as a configuration parameter of a reference subcarrier, a time parameter of the second period is identical to the time parameter of the first period, and a total quantity of slots comprised in the second period has a multiple relationship with the total quantity of slots comprised in the first period.

32. The method according to claim 28, wherein if for the BWP, the data transmission is performed by using the subcarrier configuration parameter as a configuration parameter of a reference subcarrier, a time parameter of the second period is identical to the time parameter of the first period, a total quantity of slots comprised in the second period has a multiple relationship with the total quantity of slots comprised in the first period, and within any same time segment, a transmission configuration status within the second period is consistent with the transmission configuration status within the first period.

33. The method according to claim 21, wherein a time length of the first period is $5*2^{-n}$ milliseconds, and n is an integer greater than 0.

34. A communications apparatus, comprising:
   a processor; and
   a memory to store an instruction, which when executed by the processor, cause the communications apparatus to perform an indication method, the method comprising:
   generating configuration information, wherein the configuration information comprises at least two of a subcarrier configuration parameter, a time parameter of a first period, and a total quantity of slots comprised in the first period, wherein the subcarrier configuration parameter corresponds to the first period; and
   sending the configuration information to a terminal device, wherein the configuration information is used for determining information about a second period within which the terminal device performs data transmission by using a bandwidth part (BWP).

35. The communications apparatus according to claim 34, wherein the subcarrier configuration parameter is used for indicating a subcarrier spacing, and the time parameter of the first period is used for indicating a time length of the first period.

36. The communications apparatus according to claim 35, wherein the time length of the first period belongs to a time length set of the first period, and the time length set of the first period comprises one or more time lengths corresponding to the subcarrier spacing.

37. A non-transitory computer readable storage medium storing a computer program, which when executed by a processor, causes the processor to perform an indication method, the method comprising:
   generating configuration information, wherein the configuration information comprises at least two of a subcarrier configuration parameter, a time parameter of a first period, and a total quantity of slots comprised in the first period, wherein the subcarrier configuration parameter corresponds to the first period; and
   sending the configuration information to a terminal device, wherein the configuration information is used for determining information about a second period within which the terminal device performs data transmission by using a bandwidth part (BWP).

* * * * *